United States Patent
Arita et al.

(10) Patent No.: US 11,498,351 B2
(45) Date of Patent: Nov. 15, 2022

(54) LAMINATED BODY AND METHOD FOR PRODUCING THE SAME, CURABLE LIQUID COMPOSITION SET, INKJET PRINTING APPARATUS, AND INKJET PRINTING METHOD

(71) Applicant: RICOH COMPANY, LTD., Tokyo (JP)

(72) Inventors: Manabu Arita, Tokyo (JP); Daisuke Ozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 155 days.

(21) Appl. No.: 17/093,814

(22) Filed: Nov. 10, 2020

(65) Prior Publication Data
US 2021/0138817 A1    May 13, 2021

(30) Foreign Application Priority Data

Nov. 12, 2019  (JP) .............................. JP2019-204359
Sep. 17, 2020  (JP) .............................. JP2020-156002

(51) Int. Cl.
*B41M 5/00*    (2006.01)
*B41J 11/00*   (2006.01)
(Continued)

(52) U.S. Cl.
CPC .......... *B41M 5/0023* (2013.01); *B41J 11/002* (2013.01); *C09D 11/107* (2013.01); *C09D 11/30* (2013.01); *C09D 11/54* (2013.01)

(58) Field of Classification Search
CPC ........................ B41M 7/0081; B41M 7/0045; B41M 5/0011; B41M 5/5209; C09D 11/101;
(Continued)

(56) References Cited

U.S. PATENT DOCUMENTS

| 7,862,163 B2 | 1/2011 | Maeno et al. |
| 2006/0075917 A1 | 4/2006 | Edwards |

(Continued)

FOREIGN PATENT DOCUMENTS

| EP | 1 652 686 | 5/2000 |
| EP | 1 955 858 | 8/2008 |

(Continued)

OTHER PUBLICATIONS

Extended European Search Report dated Apr. 12, 2021 in European Application No. 20206950.6.

*Primary Examiner* — John Zimmermann
(74) *Attorney, Agent, or Firm* — Grüneberg and Myers PLLC

(57) ABSTRACT

A method for producing a laminated body including a first curable liquid composition and a second curable liquid composition, the method including: forming a first liquid layer formed of the first curable liquid composition; impacting the second curable liquid composition onto the first liquid layer, to form a second liquid droplet layer formed of the second curable liquid composition inside the first liquid layer or at a lower part of the first liquid layer in a direction in which second liquid droplets for the second liquid droplet layer are impacted onto the first liquid layer; and curing the first liquid layer and the second liquid droplet layer.

20 Claims, 9 Drawing Sheets

(51) Int. Cl.
*C09D 11/107* (2014.01)
*C09D 11/30* (2014.01)
*C09D 11/54* (2014.01)

(58) Field of Classification Search
CPC ... C09D 11/40; B41J 11/00214; B41J 11/002; B41J 11/0015; B41J 2/2114
See application file for complete search history.

(56) References Cited

U.S. PATENT DOCUMENTS

| | | | |
|---|---|---|---|
| 2007/0176995 A1* | 8/2007 | Kadomatsu | B41J 2/0057 347/103 |
| 2008/0187680 A1 | 8/2008 | Kawakami et al. | |
| 2009/0085996 A1 | 4/2009 | Kasai | |
| 2012/0200651 A1 | 8/2012 | Sasada et al. | |
| 2012/0242768 A1 | 9/2012 | Seno et al. | |
| 2013/0065024 A1 | 3/2013 | Aruga et al. | |
| 2013/0303682 A1 | 11/2013 | Konda et al. | |
| 2014/0370214 A1* | 12/2014 | Araki | C09D 11/101 428/137 |
| 2017/0210144 A1 | 7/2017 | Hosaka | |
| 2017/0210926 A1* | 7/2017 | Kawamura | C09D 11/102 |
| 2017/0210927 A1* | 7/2017 | Kawamura | C09D 11/36 |
| 2018/0290477 A1 | 10/2018 | Maas et al. | |
| 2018/0333909 A1 | 11/2018 | Arita et al. | |
| 2019/0270901 A1 | 9/2019 | Fujii et al. | |
| 2020/0039274 A1 | 2/2020 | Ozaki | |

FOREIGN PATENT DOCUMENTS

| | | |
|---|---|---|
| EP | 2 042 335 | 4/2009 |
| JP | 2008-105387 | 5/2008 |
| JP | 2011-230501 | 11/2011 |
| JP | 2012-214030 | 11/2012 |
| JP | 5584868 | 8/2014 |
| JP | 5668880 | 12/2014 |
| JP | 6311761 | 3/2018 |

* cited by examiner

Entire dot diameter (immediately after)

Entrance rate (immediately after)

Entrance rate (over time)

LAMINATED BODY AND METHOD FOR PRODUCING THE SAME, CURABLE LIQUID COMPOSITION SET, INKJET PRINTING APPARATUS, AND INKJET PRINTING METHOD

CROSS-REFERENCE TO RELATED APPLICATIONS

The present application claims priority under 35 U.S.C. § 119 to Japanese Patent Application No. 2019-204359, filed Nov. 12, 2019 and Japanese Patent Application No. 2020-156002, filed Sep. 17, 2020. The contents of which are incorporated herein by reference in their entirety.

BACKGROUND OF THE INVENTION

Field of the Invention

The present disclosure relates to a laminated body, a method for producing the laminated body, a curable liquid composition set, an inkjet printing apparatus, and an inkjet printing method.

Description of the Related Art

In recent years, an active-energy-ray-curable ink has been widely used in, for example, offset, silk screen, top coat agents, and the amount of the active-energy-ray-curable ink used is increased because there are such advantages that the drying step can be simplified to reduce cost, and the amount of volatilized solvents can be reduced to protect the environment. Meanwhile, an inkjet method has recently found increased industrial applications involving decorative printing and coating because of, for example, its ability to drive on demand.

However, as inkjet properties, the coating film consistency and the adhesiveness are generally in a trade-off relationship, and only the ink coating film does not satisfy market demands in some cases. Therefore, it is necessary to subject the ink coating film to an additional coating or laminating process. However, addition of another process decreases productivity. In addition, productivity can be maintained by providing a drawing step and a coating step through inkjet in line. In this case, however, a large apparatus in which steps corresponding to the respective layers are connected is needed, which cannot be applied to a small inkjet apparatus that has a big advantage such as an on-demand property.

Meanwhile, when an inkjet apparatus such as a serial printer is used to form a multilayer, it is necessary to individually print each layer, significantly decreasing a production rate. Therefore, instead of individually printing each layer, if an under layer for adhesiveness, an upper layer for coating film consistency, and a color layer for drawing are discharged at one time in one step through inkjet printing to thereby form a multilayer without disturbing a lamination state, productivity is drastically improved. Moreover, when a multilayer is formed to separate functions, both the coating film consistency and the adhesiveness can be achieved.

However, there are the following problems. Specifically, even when inks having different functions are simply discharged at one time, layers cannot be formed, and the coating film consistency and the adhesiveness cannot be obtained. Moreover, the sharpness and the precision of an image shape are decreased to disturb an image, and the color developing property cannot be obtained.

As a method for forming an image while a layer is formed with precision, proposed is, for example, a method for producing a film that can easily produce a film with precision has been proposed (see, for example, Japanese Unexamined Patent Application Publication No. 2011-230501). The method includes: discharging a second liquid (liquid B) on a liquid surface of a first active-energy-ray-curable liquid (liquid A) by an inkjet method according to an intended periodic signal; and irradiating the liquid A and the liquid B with active energy rays for curing, to form a film on which periodic patterns are formed.

SUMMARY OF THE INVENTION

According to one aspect of the present disclosure, a method for producing a laminated body uses a first curable liquid composition and a second curable liquid composition. The method includes forming a first liquid layer formed of the first curable liquid composition; impacting the second curable liquid composition onto the first liquid layer, to form a second liquid droplet layer formed of the second curable liquid composition inside the first liquid layer or at a lower part of the first liquid layer in a direction in which second liquid droplets for the second liquid droplet layer are impacted onto the first liquid layer; and curing the first liquid layer and the second liquid droplet layer.

Figure 1:
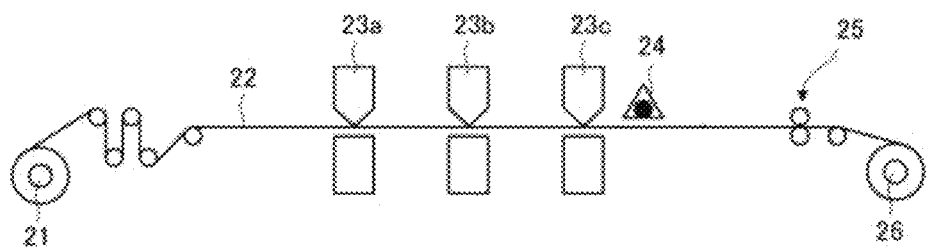
FIG. 1 is a schematic view presenting one example of an image forming apparatus including an inkjet discharging unit.

DETAILED DESCRIPTION OF THE INVENTION (Method for Producing Laminated Body)

A method of the present disclosure for producing a laminated body is a method for producing a laminated body using a first curable liquid composition and a second curable liquid composition. The method includes forming a first liquid layer formed of the first curable liquid composition; impacting the second curable liquid composition onto the first liquid layer, to form a second liquid droplet layer formed of the second curable liquid composition inside the first liquid layer or at a lower part of the first liquid layer in a direction in which second liquid droplets for the second liquid droplet layer are impacted onto the first liquid layer; and curing the first liquid layer and the second liquid droplet layer. The method further includes other steps if necessary.

The method for producing a laminated body is a method for producing a laminated body including a first curable liquid composition, a second curable liquid composition, and a third curable liquid composition. The method preferably includes: impacting the third curable liquid composition onto a substrate to form a third liquid layer formed of the third curable liquid composition; impacting the first curable liquid composition onto the third liquid layer to form a first liquid layer on the third liquid layer; impacting the second curable liquid composition onto the first liquid layer, to form a second liquid droplet layer formed of the second curable liquid composition inside the first liquid layer or inside the third liquid layer that is positioned at a lower part of the first liquid layer in a direction in which second liquid droplets for the second liquid droplet layer are impacted onto the first liquid layer; and curing the first liquid layer, the second liquid droplet layer, and the third liquid layer.

An object of the present disclosure is to provide a method for producing a laminated body, which can obtain a laminated body with a high productivity and a high image quality, and, particularly, can obtain a laminated body having a high consistency and a high adhesiveness when a plurality of curable liquid compositions having different functions are used.

According to the present disclosure, it is possible to provide a method for producing a laminated body, which can obtain a laminated body with a high productivity and a high image quality, and, particularly, can obtain a laminated body having a high consistency and a high adhesiveness when a plurality of curable liquid compositions having different functions are used.

In the conventional techniques, an active-energy-ray-curable liquid is used to form two layers: an upper layer and an under layer. However, because the thickness of the upper layer is thin, it cannot be used for application for obtaining the coating film consistency due to the upper layer. When an amount of an active-energy-ray-curable liquid of the upper layer discharged is increased to thicken the upper layer, an image of the upper layer is considerably disturbed, which is problematic.

In the present disclosure, the second liquid droplet layer formed of the second curable liquid composition can be formed (entered) inside the first liquid layer or at a lower part of the first liquid layer in a direction in which the second liquid droplets are impacted onto the first liquid layer. Therefore, even when a large amount of droplets is used, the second liquid droplet layer formed of the second curable liquid composition for drawing can be arranged in the laminated body without disturbing a state that the multilayer is formed. As a result, the sharpness, the image density, and the precision of an image shape can be achieved, resulting in stability after time passes (over time).

When the third liquid layer formed of the third curable liquid composition is covered by the first liquid layer and the second liquid droplet layer, the consistency derived from the first curable liquid composition and the second curable liquid composition, and the adhesiveness derived from the third curable liquid composition can be achieved. Moreover, because the second liquid droplet layer is covered by the first liquid layer, color loss caused by decreasing scratch resistance can be prevented.

Because a laminated body is produced without interposing a curing step between the respective steps, high productivity can be obtained, and it can be applied to a small inkjet apparatus. Because exfoliation between layers hardly occurs, the laminated body obtained by this method achieves high adhesiveness than a laminated body obtained by individually curing each layer. Therefore, it is possible to impart surface properties such as an antifouling property and slipperiness without considering the recoating property.

Therefore, according to the method of the present disclosure for producing a laminated body, it is possible to obtain a laminated body having a high productivity and a high image quality, and particularly to obtain a laminated body having a high consistency and a high adhesiveness when a plurality of curable liquid compositions having different functions are used.

<Curable Liquid Composition>

The curable liquid composition is formed of a combination of the first curable liquid composition and the second curable liquid composition, or a combination of the third curable liquid composition, the first curable liquid composition, and the second curable liquid composition. Between the respective curable liquid compositions, different physical properties and different impact behaviors are exhibited.

Preferably, the first curable liquid composition and the second curable liquid composition are liquid compositions different in formulation; the first curable liquid composition and the third curable liquid composition are liquid compositions different in formulation; or the first curable liquid composition and the second curable liquid composition are liquid compositions different in formulation and the first curable liquid composition and the third curable liquid composition are liquid compositions different in formulation.

The "being different in formulation" means being different in at least one of a component constituting a curable liquid composition or its amount.

The combination of the curable liquid compositions preferably exhibits the following impact behaviors. Specifically, the first curable liquid composition exhibits a property of spreading the first curable liquid composition on the third liquid layer formed of the third curable liquid composition to form a multilayer, and the second curable liquid composition exhibits such a property that the second curable liquid composition is not diffused on the surface of the first liquid layer formed of the first curable liquid composition to enter and stay inside the first liquid layer or at a lower part of the first liquid layer without ruffling the surface of the liquid layer. The properties can be confirmed, for example, by observing behaviors at the time of impacting or by observing the surface, inner part, and cross section of the laminated body obtained.

The aforementioned combinations can gradually reduce a speed of the liquid droplets, by forming the second liquid droplet layer formed of the second curable liquid composition inside the first liquid layer or at a lower part of the first liquid layer in a direction in which second liquid droplets for the second liquid droplet layer are impacted onto the first liquid layer, or preferably by forming the second liquid droplet layer formed of the second curable liquid composition inside the first liquid layer or inside the third liquid layer that is positioned at a lower part of the first liquid layer in a direction in which second liquid droplets for the second liquid droplet layer are impacted onto the first liquid layer. As a result, even when a large amount of liquid droplets is used, the second curable liquid composition for drawing can be arranged in the laminated body without disturbing a state that the multilayer is formed, and the third liquid layer can be covered by the first liquid layer and the second liquid droplet layer. In addition, high productivity is achieved because a laminated body can be formed without interposing a curing step in the middle of each step.

Here, the "forming the second liquid droplet layer inside the first liquid layer" means that an entire second liquid droplet layer 42 is covered with (embedded in) a first liquid layer 41 as presented in FIG. 3A, FIG. 3B, FIG. 3C, FIG. 4A, and FIG. 4B. As presented in FIG. 3C, when the third liquid layer does not exist at a lower part of the first liquid layer 41 (in the case of a two-layer configuration), a lower part of the first liquid layer 41 is a substrate 31. Therefore, because second liquid droplets 42 cannot penetrate into the substrate 31, the second liquid droplets 42 are formed side by side at a boundary between the first liquid layer 41 and the third liquid layer 43.

Figure 4A:
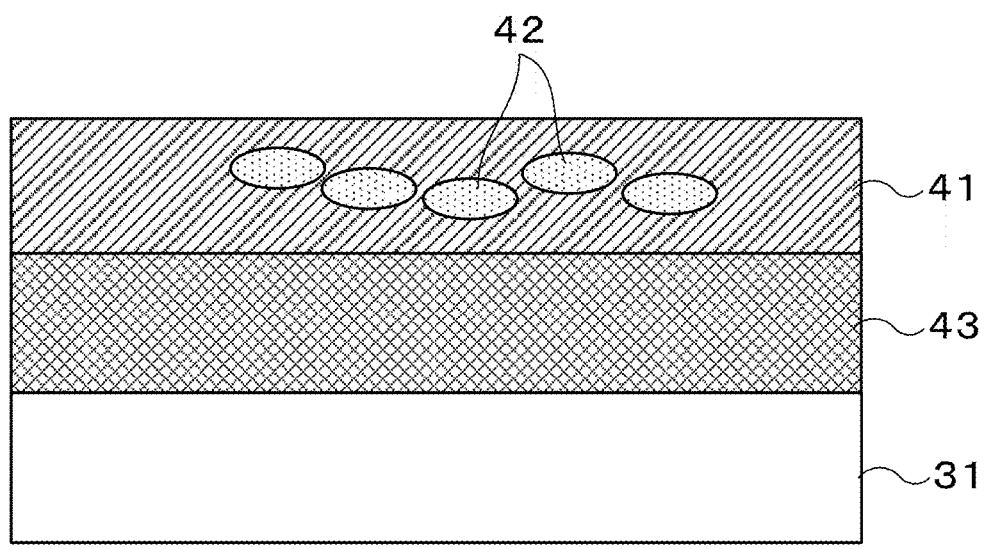
FIG. 4A is a schematic view presenting a state that a second liquid droplet layer is formed inside a first liquid layer.
Figure 4B:
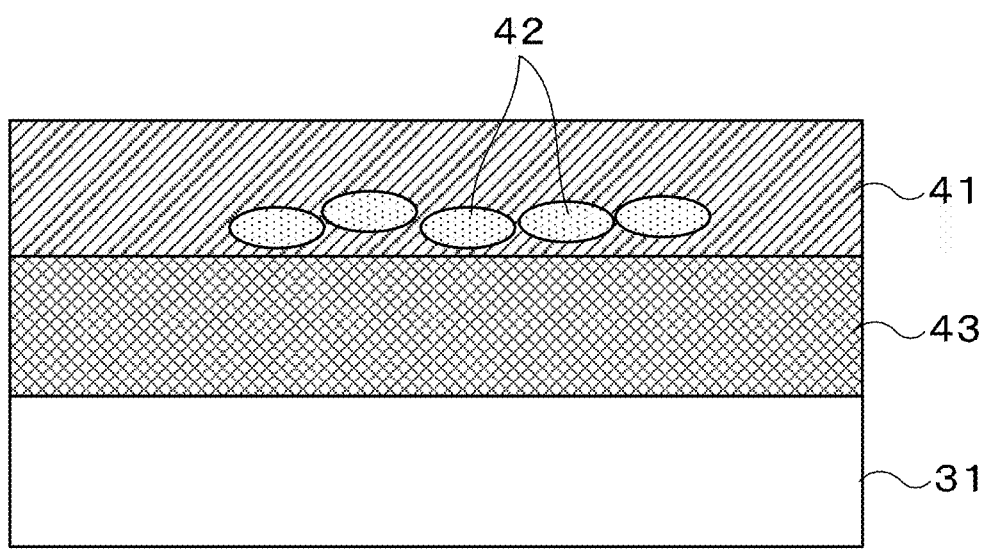
FIG. 4B is a schematic view presenting another state that a second liquid droplet layer is formed inside a first liquid layer.
Figure 4C:
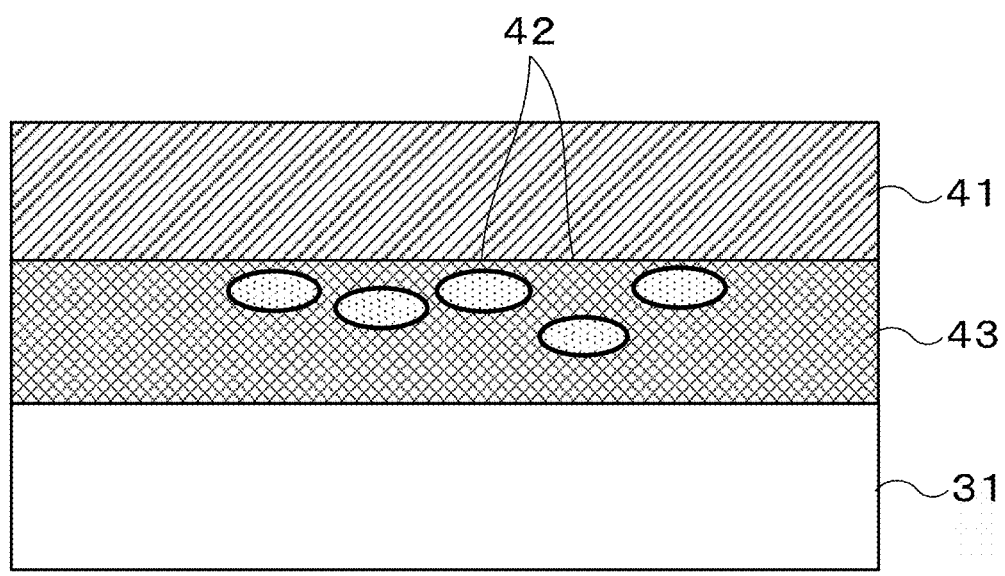
FIG. 4C is a schematic view presenting a state that a second liquid droplet layer is formed inside a third liquid layer that is position at a lower position of a first liquid layer.

The "forming the second liquid droplet layer at a lower part of the first liquid layer (or inside the third liquid layer that is positioned at a lower part of the first liquid layer)" means that the entire second liquid droplet layer 42 is covered with (embedded in) the third liquid layer 43 as presented in FIG. 4C.

Note that, FIG. 3A to FIG. 4C are each a schematic view, and a shape and a size of the second liquid droplets constituting the second liquid droplet layer are not particularly limited and may be appropriately changed.

When the aforementioned impact behaviors can be exhibited, material configurations of the first curable liquid composition, the second curable liquid composition, and the third curable liquid composition are not particularly limited and may be appropriately selected depending on the intended purpose.

The aforementioned behaviors can be changed depending on kinds or amounts of a monomer and a surfactant in the first curable liquid composition, the second curable liquid composition, and the third curable liquid composition. However, the monomer greatly affects physical properties of the cured product obtained, so preferably too many limitations are not imposed on the monomer. It is preferable that the impact behaviors be controlled by addition of a very small amount of a surfactant that can change impact behaviors.

The curable liquid compositions include a monomer and a surfactant, preferably include a polymerization initiator, a colorant, and an organic solvent, and further include other components if necessary.

<<Monomer>>

The monomer is a compound that causes polymerization reaction by active species generated through heating, active energy rays (e.g., ultraviolet rays and electron beam), or active energy rays, followed by curing. Examples of the monomers include multifunctional monomers and monofunctional monomers depending on the number of functional groups.

The monomer may be a polymerizable monomer, and may include a polymerizable oligomer and a polymerizable polymer (macromonomer).

The kind of monomer in each curable liquid composition is not particularly limited and may be appropriately selected depending on the intended purpose. Because the third curable liquid composition is positioned at the under layer of the laminated body, it preferably imparts functions such as adhesiveness, preferably includes a large amount of the monofunctional monomer, more preferably includes the monofunctional monomer in an amount of 80% by mass or more, and still more preferably 95% by mass or more, relative to the total amount of the monomers.

Because the first curable liquid composition and the second curable liquid composition are positioned at the upper layer of the laminated body, they preferably impart functions such as coating film consistency, preferably include a large amount of the multifunctional monomer, more preferably include the multifunctional monomer in an amount of 50% by mass or more relative to the total amount of the monomers.

The surface tension of the obtained curable liquid composition can be changed depending on the kind or amount of the monomers, and impact behaviors of droplets formed on the curable liquid composition can be changed. Particularly, when the surfactant has a low ability to decrease the surface tension or when an amount of the surfactant is low, an influence of the monomers included becomes great. Meanwhile, particularly, in the case where the surfactant has a high ability to decrease the surface tension or in the case where an amount of the surfactant is high, when the surface tension of the monomer formulation is sufficiently high relative to that of the surfactant, an influence of the monomers included becomes small. Therefore, it is possible to cause the same impact behaviors regardless of inclusion of the monomer.

—Multifunctional Monomer—

Examples of the multifunctional monomer include bifunctional monomers, trifunctional monomers, and monomers having the number of functional groups of 4 or more.

The multifunctional monomer is not particularly limited and may be appropriately selected depending on the intended purpose. Examples of the multifunctional monomer include neopentyl glycol di(meth)acrylate, (poly)ethylene glycol di(meth)acrylate, diethylene glycol di(meth)acrylate, triethylene glycol di(meth)acrylate, tetraethylene glycol di(meth)acrylate, (poly)propylene glycol di(meth)acrylate, dipropylene glycol di(meth)acrylate, (poly)tetramethylene glycol di(meth)acrylate, bisphenol A propylene oxide (PO) adduct di(meth)acrylate, ethoxylated neopentyl glycol di(meth)acrylate, propoxylated neopentyl glycol di(meth)acrylate, bisphenol A ethylene oxide (EO) adduct di(meth)acrylate, EO-modified pentaerythritol tri(meth)acrylate, PO-modified pentaerythritol tri(meth)acrylate, EO-modified pentaerythritol tetra(meth)acrylate, PO-modified pentaerythritol tetra(meth)acrylate, EO-modified dipentaerythritol tetra(meth)acrylate, PO-modified dipentaerythritol tetra(meth)acrylate, EO-modified trimethylolpropane tri(meth)acrylate, PO-modified trimethylolpropane tri(meth)acrylate, EO-modified tetramethylolmethane tetra(meth)acrylate, PO-modified tetramethylolmethane tetra(meth)acrylate, pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, trimethylolethane tri(meth)acrylate, trimethylolpropane tri(meth)acrylate, bis(4-(meth)acryloxy polyethoxyphenyl)propane, diallylphthalate, triallyl trimellitate, 1,6-hexanediol di(meth)acrylate, 1,9-nonanethol di(meth)acrylate, 1,3-butylene glycol di(meth)acrylate, 1,10-decanediol di(meth)acrylate, hydroxypivalic acid neopentyl glycol di(meth)acrylate, tetramethylolmethane tri(meth)acrylate, dimethyloltricyclodecane di(meth)acrylate, modified glycerin tri(meth)acrylate, bisphenol A diglycidyl ether (meth)acrylic acid adduct, modified bisphenol A di(meth)acrylate, caprolactone-modified dipentaerythritol hexa(meth)acrylate, dipentaerythritol hexa(meth)acrylate, pentaerythritol tri(meth)acrylate tolylene diisocyanate urethane prepolymer, pentaerythritol tri(meth)acrylate hexamethylene diisocyanate urethane prepolymer, ditrimethylolpropane tetra(meth)acrylate, pentaerythritol tri(meth) acrylate hexamethylene diisocyanate urethane prepolymer, urethane acrylate oligomer, epoxy acrylate oligomer, polyester acrylate oligomer, polyether acrylate oligomer, and silicone acrylate oligomer. These may be used alone or in combination. Among them, the number of functional groups is preferably from 2 through 6, the bifunctional monomer is particularly preferable because of a low viscosity.

—Monofunctional Monomer—

The monofunctional monomer is a monomer having the number of functional groups of 1.

The monofunctional monomer is not particularly limited and may be appropriately selected depending on the intended purpose. Examples of the monofunctional monomer include hydroxyethyl (meth)acrylamide, (meth)acryloylmorpholine, dimethylaminopropyl acrylamide, isobornyl (meth)acrylate, adamantyl (meth)acrylate, 2-methyl-2-adamantyl (meth) acrylate, dicyclopentenyl (meth) acrylate, dicyclopentanyl (meth) acrylate, dicyclopentenyl oxyethyl (meth)acrylate, 3,3,5-trimethylcyclohexane (meth) acrylate, t-butylmethacrylate, tetrahydrofurfuryl (meth)acrylate, cyclohexyl (meth) acrylate, benzyl (meth)acrylate, 2-hydroxyethyl (meth) acrylate, 2-hydroxypropyl (meth)acrylate, 2-hydroxybutyl acrylate, isobutylacrylate, t-butylacrylate, phenoxyethyl acrylate, (2-methyl-2-ethyl-1,3-dioxolan-4-yl) methylacrylate, and cyclic trimethylolpropane formal acrylate. These may be used alone or in combination.

<<Surfactant>>

The surfactant is added in order to impart different liquid physical properties so that each curable liquid composition exhibits the aforementioned impact behaviors.

The second curable liquid composition exhibits such a property that the second curable liquid composition enters and stays in the first liquid layer formed of the first curable liquid composition. Therefore, the surfactant can be selected depending on a relationship with the surface tension of the first curable liquid composition. The kind of surfactant is not particularly limited and may be appropriately selected depending on the intended purpose. Examples of the surfactant include fluorine-based surfactants, silicone-based surfactants, and organic surfactants.

Meanwhile, the kind of surfactant in the first curable liquid composition is not particularly limited and may be appropriately selected depending on the intended purpose. Examples thereof include fluorine-based surfactants, silicone-based surfactants, and organic surfactants. Among them, silicone-based surfactants are preferable. It is believed that the silicone-based surfactant often exhibits a low dynamic surface tension for the static surface tension, and the surfactant is easily reoriented at the time of impacting. Therefore, the first curable liquid composition easily expresses such a property that first curable liquid composition diffuses and spreads on the surface of the third liquid layer formed of the third curable liquid composition, to form a multilayer.

<Polymerization Initiator>

The curable liquid composition of the present disclosure optionally contains a polymerization initiator. The polymerization initiator produces active species such as a radical or a cation upon application of energy of heat or an active energy ray and initiates polymerization of a polymerizable compound (monomer or oligomer). As the polymerization initiator, it is suitable to use a known radical polymerization initiator, cation polymerization initiator, base producing agent, or a combination thereof. Among them, a radical polymerization initiator is preferable.

The radical polymerization initiator is not particularly limited and may be appropriately selected depending on the intended purpose. Examples of the radical polymerization initiator include aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

An amount of the polymerization initiator is preferably 5% by mass or more but 20% by mass or less relative to a total amount of the curable liquid composition in order to obtain sufficient curing speed.

In addition, a polymerization accelerator (sensitizer) is optionally used together with the polymerization initiator. The polymerization accelerator is not particularly limited and may be appropriately selected depending on the intended purpose. Examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimthyl benzylamine and 4,4'-bis(diethylamino)benzophenone.

An amount of the polymerization accelerator is not particularly limited and may be determined depending on the identity (type) of the polymerization initiator and the amount thereof.

<<Colorant>>

The curable liquid composition may contain a colorant. As the colorant, various pigments and dyes may be used that impart black, white, magenta, cyan, yellow, green, orange, and gloss colors such as gold and silver, depending on the intended purpose of the curable liquid composition and requisite properties thereof.

A content of the colorant in the composition is not particularly limited, and may be appropriately determined considering, for example, a desired color density and dispersibility of the colorant in the composition. However, it is preferably 0.1% by mass or more but 20% by mass or less relative to a total amount of the curable liquid composition.

Here, the curable liquid composition does not necessarily contain a colorant but can be clear and colorless. In such a case, for example, such a clear and colorless composition is good for an overcoating layer to protect an image.

The colorant is optionally added to each combination of the curable liquid compositions. However, the second curable liquid composition that is finally impacted easily arranges dots of droplets with high precision, and is preferable as a colorant-containing color ink for drawing. The first curable liquid composition positioned at the upper layer is preferably a clear ink containing no colorant. The third curable liquid composition as the under layer is preferably a white ink or a clear ink.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment.

The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The curable liquid composition of the present disclosure optionally contains an organic solvent although it is preferable to spare it.

The curable liquid composition free of an organic solvent, in particular volatile organic compound (VOC), is preferable because it enhances safety at where the curable liquid composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1% by mass.

<<Other Components>>

The curable liquid composition of the present disclosure optionally contains other components.

The other known components are not particularly limited and may be appropriately selected depending on the intended purpose. Specific examples thereof include, but are not limited to, articles such as polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<<Preparation of Curable Liquid Composition>>

The curable liquid composition of the present disclosure can be prepared by using the components described above. The preparation devices and conditions are not particularly limited. For example, the curable liquid composition can be prepared by subjecting a monomer, a colorant, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a monomer, a polymerization initiator, a polymerization inhibitor, and a surfactant.

<Viscosity>

The viscosity of the curable liquid composition is not particularly limited and may be appropriately adjusted depending on the purpose and application devices. For example, when an ejecting unit configured to the curable liquid composition from nozzles is used, the viscosity of the curable liquid composition at 25° C. is preferably 15 mPa·s or more but 40 mPa·s or less, more preferably 20 mPa·s or more but 40 mPa·s or less. When the viscosity thereof in the range of from 20° C. through 65° C. is preferably 5 mPa·s or more but 15 mPa·s or less, more preferably 6 mPa·s or more but 12 mPa·s or less.

When the viscosity falls within the aforementioned range, discharging can be performed through inkjet, and the first curable liquid composition, the second curable liquid composition, and the third curable liquid composition preferably have a viscosity of less than 40 mPa·s at 25° C. As a result, all the steps can be performed by the inkjet method.

Moreover, it is preferable to satisfy the following expression: "viscosity of the third curable liquid composition"–"viscosity of the first curable liquid composition">–15 mPa·s, and the following expression: "viscosity of the third curable liquid composition"–"viscosity of the second curable liquid composition">–15 mPa·s. When a difference between the viscosities is more than –15 mPa·s, the third liquid layer formed of the third curable liquid composition is hardly penetrated by the first curable liquid composition or droplets formed of the second curable liquid composition. Therefore, functions of the under layer such as adhesiveness are easily maintained, and the color of the under layer is easily maintained. Moreover, a difference between viscosities is more preferably more than –5 mPa s. Almost no penetration occurs even when a degree of the entrance is not adjusted.

It is preferable to satisfy the following expression: 15 mPa·s>"viscosity of the third curable liquid composition"–"viscosity of the second curable liquid composition" and the following expression: 15 mPa·s>"viscosity of the first curable liquid composition"–"viscosity of the second curable liquid composition". When a difference between the viscosities is less than 15 mPa s, the third liquid layer formed of the third first curable liquid composition or the first liquid layer formed of the first curable liquid composition is easily deformed, droplets formed of the second curable liquid composition enter and stay in the liquid layer formed of the first curable liquid composition, and the surface is easily covered by the first curable liquid composition. Therefore, a function of protecting the second liquid droplets is easily maintained.

In addition, it is particularly preferable to satisfy this viscosity range by the composition free of the organic solvent described above.

Incidentally, the viscosity can be measured by a cone plate rotary viscometer (VISCOMETER TVE-22L, manufactured by TOKI SANGYO CO., LTD.) using a cone rotor (1°

34'×R24) at a number of rotation of 50 rpm with a setting of the temperature of constant temperature circulating water in the range of from 20° C. through 65° C. VISCOMATE VM-150III can be used for the temperature adjustment of the circulating water.

(Curable Liquid Composition Set)

A curable liquid composition set of the present disclosure includes a first curable liquid composition and a second curable liquid composition, preferably includes a third curable liquid composition.

Because the second curable liquid composition has such a property that the second curable liquid composition enters and stays in the first liquid layer without ruffling the surface of the first liquid layer formed of the first curable liquid composition, the curable liquid composition set satisfies the following expression: "static surface tension of the first curable liquid composition"−"150 msec dynamic surface tension of the second curable liquid composition"≤0 mN/m and the following expression: "static surface tension of the first curable liquid composition"−"static surface tension of the second curable liquid composition"<6 mN/m, preferably satisfies the following expression: "static surface tension of the first curable liquid composition"−"static surface tension of the second curable liquid composition"<3 mN/m, more preferably satisfies the following expression: "static surface tension of the first curable liquid composition"−"static surface tension of the second curable liquid composition"≤0 mN/m.

When the following expression: "static surface tension of the first curable liquid composition"−"150 msec dynamic surface tension of the second curable liquid composition" is 0 mN/m or less, a droplet formed of the second curable liquid composition is difficult to instantly spread on the surface of the first liquid layer formed of the first curable liquid composition, and ruffling of the liquid surface hardly occurs, which makes it possible to maintain a dot shape.

When the following expression: "static surface tension of the first curable liquid composition"−"static surface tension of the second curable liquid composition" is less than 6 mN/m, a droplet formed of the second curable liquid composition may enter the first liquid layer formed of the first curable liquid composition. When the following expression: "static surface tension of the first curable liquid composition"−"static surface tension of the second curable liquid composition" is less than 3 mN/m, the droplet is hard to float even after time passes while entering the first liquid layer. When the following expression: "static surface tension of the first curable liquid composition"−"static surface tension of the second curable liquid composition" is 0 mN/m or less, it possible to maintain a state that the droplet securely enters the first liquid layer even after time passes. That is, when the following expression: "static surface tension of the first curable liquid composition"−"static surface tension of the second curable liquid composition"≤0 mN/m is satisfied, the second curable liquid composition is less disposed on the surface of the first liquid layer. Particularly, regardless of time from impacting to UV irradiation, the droplets formed of the second curable liquid composition can form a layer inside the first liquid layer formed of the first curable liquid composition or at a lower part of the first liquid layer in a direction in which second liquid droplets for the second liquid droplet layer are impacted onto the first liquid layer.

The curable liquid composition set preferably satisfies the following expression: "static surface tension of the third curable liquid composition"−"static surface tension of the first curable liquid composition">0 mN/m because the first curable liquid composition has such a property that the first curable liquid composition spreads on the third liquid layer formed of the third curable liquid composition to form a multilayer.

When the following expression: "static surface tension of the third curable liquid composition"−"static surface tension of the first curable liquid composition">0 mN/m is satisfied, the first curable liquid composition hardly enters and stays in the third liquid layer, and is floated at least after time passes. Therefore, it is easy to form such a multilayer that the first curable liquid composition is disposed on the third liquid layer, which is advantageous.

The curable liquid composition set preferably satisfies the following expression: "static surface tension of the third curable liquid composition"−"150 msec dynamic surface tension of the first curable liquid composition">−1 mN/m.

When the following expression: "static surface tension of the third curable liquid composition"−"150 msec dynamic surface tension of the first curable liquid composition">−1 mN/m is satisfied, a droplet formed of the first curable liquid composition easily instantly diffuses on the surface of the third liquid layer formed of the third curable liquid composition at the time of impacting, and can spread on the surface.

Here, the static surface tension and the dynamic surface tension of the curable liquid compositions in the curable liquid composition set can be measured in the following manners.

—Static Surface Tension—

The static surface tension is measured using a platinum plate by the plate method at 25° C. with, for example, an automatic surface tensiometer (DY-300, available from Kyowa Interface Science Co., Ltd).

—Dynamic Surface Tension—

Regarding the dynamic surface tension, the 150 msec dynamic surface tension is measured at 25° C. using, for example, a dynamic surface tension meter (available from DynoTesterm, SITA).

Preferably, the first curable liquid composition is a clear ink, the second curable liquid composition is a color ink or a white ink, and the third curable liquid composition is a clear ink or a white ink.

The first curable liquid composition preferably includes a silicone-based surfactant.

The first curable liquid composition and the second curable liquid composition preferably include a multifunctional monomer in an amount of 50% by mass or more relative to a total amount of monomers. The third curable liquid composition preferably includes a monofunctional monomer in an amount of 80% by mass or more, more preferably in an amount of 95% by mass or more, relative to a total amount of monomers.

The first curable liquid composition, the second curable liquid composition, and the third curable liquid composition preferably have a viscosity of less than 40 mPa·s at 25° C.

The curable liquid composition set preferably satisfies the following expression: "viscosity of the third curable liquid composition at 25° C."−"viscosity of the first curable liquid composition at 25° C.">−15 mPa·s; the following expression: 15 mPa·s>"viscosity of the third curable liquid composition at 25° C."−"viscosity of the second curable liquid composition at 25° C.">−15 mPa·s: and the following expression: 15 mPa·s>"viscosity of the first curable liquid composition at 25° C."−"viscosity of the second curable liquid composition at 25° C.".

<Application Field>

The application field of the curable liquid composition and the curable liquid composition set is not particularly limited. They can be generally applied to any field where an active-energy-ray-curable material is used. For example, the curable liquid composition and the curable liquid composition set can be appropriately selected depending on the intended purpose and are used for a resin for processing, a paint, an adhesive, an insulant, a releasing agent, a coating material, a sealing material, various resists, and various optical materials.

In addition, the present disclosure includes cured materials obtained by curing the curable liquid composition and processed products obtained by processing structures having the cured materials on a substrate. The processed product is fabricated by, for example, heat-drawing and punching a cured material or structure having a sheet-like form or film-like form. The processed product can suitably be used in applications necessary for molding a surface after decoration (e.g., meters or operation panels of vehicles, office machines, electric and electronic machines, and cameras).

(Method for Producing Laminated Body)

A method of the present disclosure for producing a laminated body includes a first liquid layer forming step, a second liquid droplet layer forming step, and a curing step, preferably includes a third liquid layer forming step, and further includes other steps if necessary.

As the first curable liquid composition, the second curable liquid composition, and the third curable liquid composition in the method for producing a laminated body, the first curable liquid composition, the second curable liquid composition, and the third curable liquid composition in the curable liquid composition set of the present disclosure are preferably used.

<First Liquid Layer Forming Step>

The first liquid layer forming step is a step of forming a first liquid layer formed of a first curable liquid composition.

As the first curable liquid composition, the first curable liquid composition in the aforementioned curable liquid composition set can be used.

A method for applying the first curable liquid composition is not particularly limited and may be appropriately selected depending on the intended purpose. Examples of the method include: coating methods such as a knife coating method, a nozzle coating method, a die coating method, a lip coating method, a comma coating method, a gravure coating method, a rotary screen coating method, a reverse roll coating method, a roll coating method, a spin coating method, a kneader coating method, a bar coating method, a blade coating method, a cast method, a clip method, and a curtain coating method; and an inkjet method. Among them, an inkjet method is preferable.

<Second Liquid Droplet Layer Forming Step>

The second liquid droplet layer forming step is a step of impacting the second curable liquid composition onto the first liquid layer, to form a second liquid droplet layer formed of the second curable liquid composition inside the first liquid layer or at a lower part of the first liquid layer in a direction in which second liquid droplets for the second liquid droplet layer are impacted onto the first liquid layer.

As the second curable liquid composition, the second curable liquid composition in the aforementioned curable liquid composition set can be used.

A method for applying the second curable liquid composition is not particularly limited and may be appropriately selected depending on the intended purpose. However, an inkjet method is preferable.

<Third Liquid Layer Forming Step>

The third liquid layer forming step is a step of impacting a third curable liquid composition onto a substrate to form a third liquid layer formed of the third curable liquid composition.

<<Base Material>>

The substrate is not particularly limited and may be appropriately selected depending on the intended purpose. Examples of the substrate include: sheets such as plastic films, synthetic paper formed of synthetic fibers, and non-woven fabrics; and construction materials. Among them, substrates having durability are preferable, construction materials are more preferable.

The substrate is not particularly limited and may be appropriately selected depending on the intended purpose. Examples of the substrate include paper (e.g., natural paper and synthetic paper), plastic films, non-woven fabrics, cloths, wood materials, metallic thin films, leather, glass, ceramics, and composite materials thereof. Among them, plastic films are preferable in terms of processability.

Examples of the plastic film include: polyester films; polypropylene films; polyethylene films; plastic films such as nylon, vinylon, and acryl; and those obtained by pasting the films.

The plastic film is not particularly limited and may be appropriately selected depending on the intended purpose. In terms of strength, uniaxially or biaxially stretched plastic films are preferable.

The non-woven fabric is not particularly limited and may be appropriately selected depending on the intended purpose. Examples of the non-woven fabric include products obtained by providing polyethylene fibers in the form of a sheet and subjecting the polyethylene fibers to thermocompression bonding to form a sheet.

Examples of the construction material include flooring materials, wallpaper, interior materials, wall plate materials, baseboard materials, ceiling materials, thermosetting resins used in, for example, pillars, fiber boards, particle boards, and materials obtained by providing, on the surface of the aforementioned material, decorative boards of, for example, thermosetting resins, olefin, polyester, and PVC.

A method for applying the third curable liquid composition on the substrate is not particularly limited and may be appropriately selected depending on the intended purpose. Examples of the method include: coating methods such as a knife coating method, a nozzle coating method, a die coating method, a lip coating method, a comma coating method, a gravure coating method, a rotary screen coating method, a reverse roll coating method, a roll coating method, a spin coating method, a kneader coating method, a bar coating method, a blade coating method, a cast method, a dip method, and a curtain coating method; and an inkjet method. Among them, an inkjet method is preferable.

As the third curable liquid composition, the third curable liquid composition in the aforementioned curable liquid composition set can be used.

<Curing Step>

The curing step is a step of curing the first liquid layer and the second liquid droplet layer, and further third liquid layer.

Examples of the curing means include curing through heat and curing through active energy rays. Among them, curing through active energy rays is preferable.

The active energy rays are not particularly limited so long as necessary energy can be imparted to allow the polymerization reaction of a polymerizable component to proceed. Specific examples thereof include electron beams, α-rays, β-rays, γ-rays, and X-rays, in addition to ultraviolet rays.

When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Other Steps>

Other steps are not particularly limited and may be appropriately selected depending on the intended purpose. Examples of the other steps include a controlling step.

<Composition Stored Container>

The composition stored container contains the curable liquid composition and is suitable for the applications as described above. For example, if the curable liquid composition of the present disclosure is used for ink, a container that stores the curable liquid composition can be used as an ink cartridge or an ink bottle. Therefore, users can avoid direct contact with the curable liquid composition during operations such as transfer or replacement of the ink, so that fingers and clothes are prevented from contamination. Furthermore, inclusion of foreign matters such as dust in the curable liquid composition can be prevented. In addition, the container can be of any size, any form, and any material. For example, the container can be designed to a particular application. It is preferable to use a light blocking material to block the light or cover a container with a light blocking sheet, etc.

(Inkjet Printing Apparatus and Inkjet Printing Method)

An inkjet printing apparatus of the present disclosure includes: a first discharging unit configured to discharge a first curable liquid composition to form a first liquid layer; a second discharging unit configured to discharge a second curable liquid composition to form a second liquid droplet layer; a curing unit configured to cure the first liquid layer and the second liquid droplet layer; and a composition storing part that stores each curable liquid composition in the curable liquid composition set of the present disclosure. The inkjet printing apparatus of the present disclosure preferably includes a third discharging unit configured to discharge a third curable liquid composition on a substrate, and further includes other units if necessary.

An inkjet printing method of the present disclosure is an inkjet printing method using the curable liquid composition set of the present disclosure. The inkjet printing method includes: a first discharging step of discharging a first curable liquid composition to form a first liquid layer; a second discharging step of discharging a second curable liquid composition to form a second liquid droplet layer; and a curing step of curing the first liquid layer and the second liquid droplet layer. The inkjet printing method of the present disclosure preferably includes a third discharging step of discharging a third curable liquid composition on a substrate to form a third liquid layer, and further includes other steps if necessary.

<Image Forming Method and Image Forming Apparatus>

An image forming method may be performed using an active energy ray and/or while applying heat.

The image forming method in accordance with some embodiments of the present invention includes at least an irradiating step of irradiating the curable liquid composition with an active energy ray to cure the curable liquid composition. The image forming apparatus of the present disclosure includes at least an irradiator to irradiate the curable liquid composition of the present disclosure with an active energy ray and a storing part containing the curable liquid composition of the present disclosure. The storing part may include the container mentioned above. Furthermore, the method and the apparatus may respectively include a discharging step and a discharging device to discharge the curable liquid composition. The method of discharging the curable liquid composition is not particularly limited, and examples thereof include a continuous jetting method and an on-demand method. The on-demand method includes a piezo method, a thermal method, an electrostatic method, etc.

FIG. 1 is one example of an image forming apparatus equipped with an inkjet discharging unit. The respective printing units 23*a*, 23*b*, and 23*c*, each of which has an ink cartridge including a first curable liquid composition, a second curable liquid composition, and a third curable liquid composition, and a discharging head, discharge the curable liquid composition onto a substrate 22 supplied from a supplying roller 21. Then, a light source 24 configured to cure the curable liquid composition emits active energy rays to cure the curable liquid composition. As a result, a laminated body is formed. Thereafter, the substrate 22 is conveyed to a processing unit 25 and a printed matter winding roll 26. In each of the printing units 23*a*, 23*b*, and 23*c*, an ink discharging part may include a heating mechanism configured to liquidize the curable liquid composition. If necessary, a mechanism configured to cool the substrate to around room temperature in a contact or non-contact manner may be disposed. As the inkjet printing method, a serial method or a line method can be applied. The serial method is a method where the curable liquid composition is discharged onto a substrate by moving the head while the substrate intermittently moves depending on the width of a discharging head. The line method is a method where the curable liquid composition is discharged onto a substrate from a head held at a fixed position while the substrate continuously moves.

The substrate 22 is not particularly limited and may be appropriately selected depending on the intended purpose. Specific examples thereof include, but are not limited to, paper, films, ceramics, glass, metals, and composite materials thereof, each of which may be in the form of a sheet. The image forming apparatus may have a one-side printing configuration and/or a two-side printing configuration. The substrate 22 is not limited to articles that are used as typical substrates. Examples of the articles usable as the substrate include cardboard, building materials (such as wall paper and floor material), concrete, cloth for apparel (such as T-shirts), textile, and leather.

Examples of the laminated body produced by the curable liquid composition set of the present disclosure include: a laminated body printed on a smooth surface of, for example, typical paper or a resin film; a laminated body printed on a surface to be printed that has roughness portions; and a laminated body printed on a surface to be printed that is made of various materials such as metals and ceramics. Moreover, a partially three-dimensional image (an image formed a two-dimensional image and a three-dimensional image) or a three dimensional object can be formed by laminating two-dimensional images.

Figure 2:
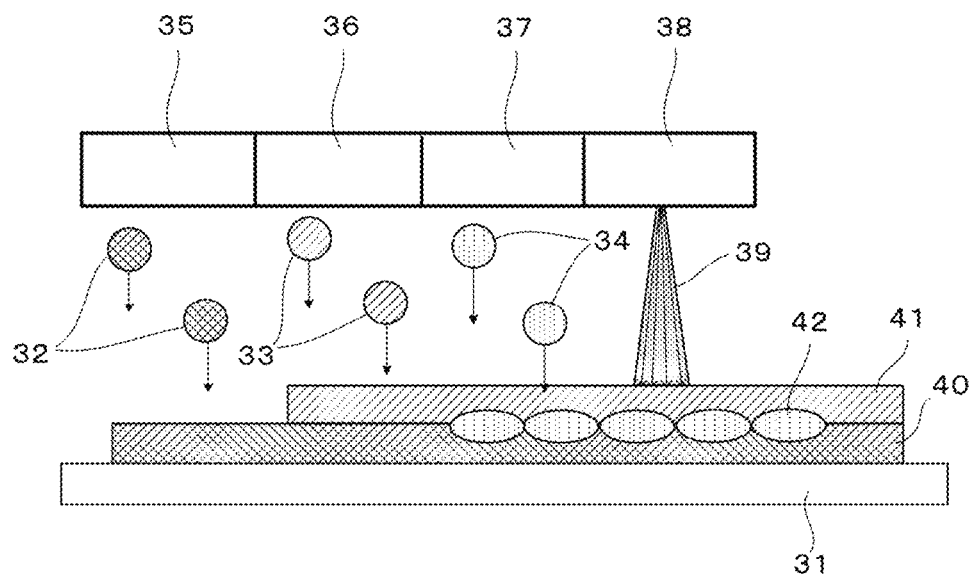
FIG. 2 is a schematic view presenting a state that a laminated body is formed using an inkjet discharging apparatus that includes a series of carriage in which a plurality of inkjet heads and a UV light source are mounted.
Figure 3A:
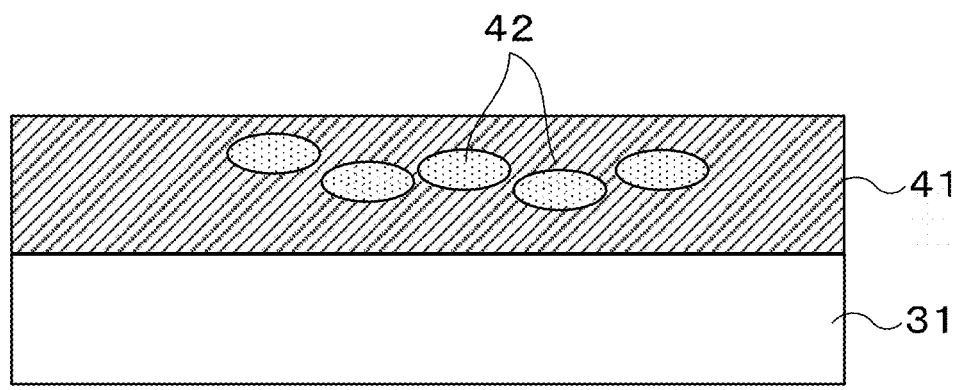
FIG. 3A is a schematic view presenting a state that a second liquid droplet layer is formed inside a first liquid layer.
Figure 3B:
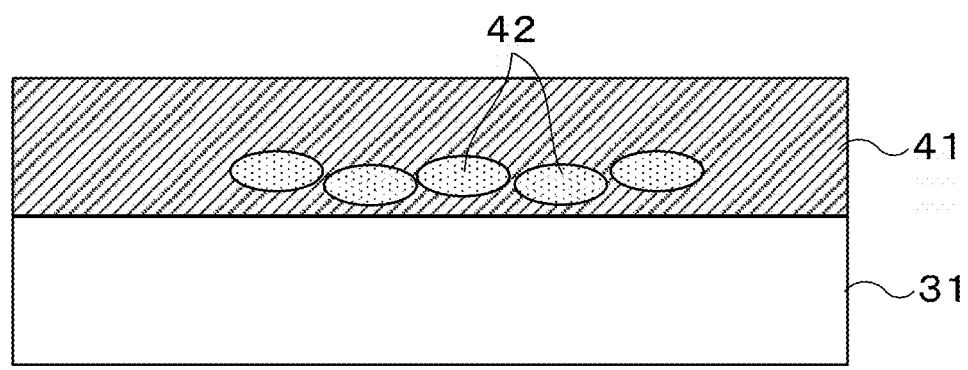
FIG. 3B is a schematic view presenting a state that a second liquid droplet layer is formed inside a first liquid layer.
Figure 3C:
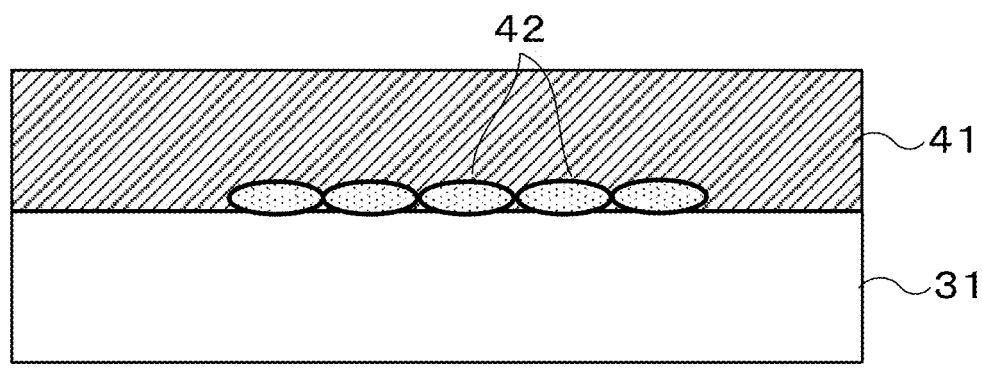
FIG. 3C is a schematic view presenting another state that a second liquid droplet layer is formed inside a first liquid layer.

FIG. 2 is a schematic view presenting how a laminated body is formed. From the left, presented are a step of impacting, onto a substrate 31, a third curable liquid composition 32 discharged from a discharging unit 35 in which a third curable liquid composition is mounted, to form a third liquid layer 43 formed of the third curable liquid composition 32; a step of impacting, onto the third liquid layer 43 formed of the third curable liquid composition, a first curable liquid composition 33 discharged from a discharging unit 36 in which a first curable liquid composition is mounted, to form a first liquid layer 41 formed of the first curable liquid composition 33 on the third liquid layer 43; a step of impacting, onto the first liquid layer 41 formed of the first curable liquid composition 33, a second curable liquid composition 34 discharged from a discharging unit 37 in which a second curable liquid composition is mounted, to form a droplet of the second curable liquid composition 34 between the third liquid layer 43 formed of the third curable liquid composition 32 and the first liquid layer 41 formed of the first curable liquid composition 33; and a curing step through active energy rays 39 emitted from an active energy rays emitting unit 38.

An inkjet printing apparatus preferably includes; a third discharging unit 35 configured to discharge the third curable liquid composition 32; a first discharging unit 36 configured to discharge the first curable liquid composition 33; a second discharging unit 37 configured to discharge the second curable liquid composition 34; and an active energy rays emitting unit 38 configured to emit active energy rays for curing, in this order.

(Laminated Body)

A laminated body of the present disclosure includes; a first liquid layer formed of a first curable liquid composition; and a second liquid droplet layer formed of a second curable liquid composition. The second liquid droplet layer exists inside the first liquid layer or at a lower part of the first liquid layer in a direction in which second liquid droplets for the second liquid droplet layer are impacted onto the first liquid layer, and the second liquid droplet layer has a dot shape. The second liquid droplet layer satisfies an expression below; "internal dot area">"surface exposure dot area".

Preferably, a laminated body includes: the first liquid layer formed of the first curable liquid composition; the second liquid droplet layer formed of the second curable liquid composition; and a third liquid layer formed of a third curable liquid composition, the second liquid droplet layer exists inside the first liquid layer or inside the third liquid layer that is positioned at a lower part of the first liquid layer in a direction in which second liquid droplets for the second liquid droplet layer are impacted onto the first liquid layer, the second liquid droplet layer has a clot shape, and the second liquid droplet layer satisfies an expression below: "internal dot area">"surface exposure dot area".

In the laminated body, the second liquid droplet layer preferably satisfies the following expression: "surface exposure dot area"/"internal dot area"<0.5.

In the present disclosure, the second curable liquid composition passes through the first liquid layer to form the second liquid droplet layer formed of the second curable liquid composition in the form of a dot. Therefore, the component formed of the second curable liquid composition may remain partially on the surface of the first liquid layer, which means that the second liquid droplet layer enters and stays in the first liquid layer; i.e., there is a part where the second liquid droplet layer is covered by the first liquid layer. The second liquid droplet layer satisfies the following expression: "internal dot area">"surface exposure dot area", a greater part of the area is preferably covered, and the following expression: "surface exposure dot area"/"internal dot area"<0.5 is more preferably satisfied. At this time, when the dot areas in the expression are converted into dot diameters, "surface exposure dot diameter"/"internal dot diameter"<0.707 is satisfied.

Moreover, most of the second liquid droplet layer other than residues is preferably covered by the first liquid layer, and 90% or more of the second liquid droplet layer can be covered; i.e., the following expression: "surface exposure dot area"/"internal dot area"<0.1 is preferably satisfied. At this time, when the dot areas in the expression are converted into dot diameters, "surface exposure dot diameter"/"internal dot diameter"<0.316 is satisfied.

On the surface (outermost surface) of the first liquid layer, preferably, the third liquid layer is covered by the first liquid layer and the second liquid droplet layer, and is not exposed. This makes it possible to separate functions between the upper layer and the under layer. For example, when the third curable liquid composition is a liquid composition for adhesiveness and the first curable liquid composition and the second curable liquid composition are liquid compositions for protecting the surface, the adhesiveness and the consistency can be achieved. Moreover, the second liquid droplet layer is covered by the first liquid layer.

Using the curable liquid composition set of the present disclosure, when the second curable liquid composition is a color ink for drawing and the first curable liquid composition is a clear ink, the color ink can be protected by the first liquid, and the color of the color ink can be prevented from being transferred in the scratch resistance test or the chemical resistance test. Moreover, the color ink formed of the second curable liquid composition can be covered by the clear ink, which makes it possible to maintain sharpness of the color dots.

Here, the "surface exposure dot area" and the "internal dot area" of the second liquid droplets can be measured using a confocal laser scanning microscope in the following manners.

In a laser image, a strongly reflected ink tends to be seen as white, and a weakly reflected ink tends to be seen as black. For example, a white ink containing titanium oxide tends to be seen as white, and a clear ink containing no pigment tends to be seen black. Therefore, it is possible to find the kind of curable liquid composition exposed to the outermost surface and its area (surface exposure dot area). The color image obtained simultaneously is a color image in which the clear ink and other inks are transmitted. Therefore, even when color dots enter the inner part, a whole (internal maximum) dot area (internal dot area) can be found. As a result, the surface exposure area and the whole (internal) area of the clot can be observed by the color image and the laser image of the confocal laser scanning microscope.

The laminated body preferably includes two layers of the third liquid layer formed of the third curable liquid composition and the first liquid layer formed of the first curable liquid composition. These two layers preferably have a thickness of 35 μm or less, more preferably have a thickness of 25 μm or less. It is observed that the stronger a property of spreading an impacted droplet near the surface of the liquid surface is, the stronger a ruffling tendency is. Therefore, preferably, the number of layers is small, and the thickness of the layer is small.

EXAMPLES

Examples of the present disclosure will be described hereinafter. However, the present disclosure should not be construed as being limited to these Examples.

Example 1

—Preparation of Curable Liquid Composition—

First, acryloylmorpholine (ACMO) (18 parts by mass), phenoxyethyl acrylate (PEA) (40 parts by mass), cyclic trimethylolpropane formal acrylate (CTFA) (30 parts by mass), aliphatic urethane acrylate (CN963) (2 parts by mass), and 2,4,6-trimethylbenzoyl-diphenyl-phosphine oxide (TPO) (10 parts by mass) were added.

Next, titanium oxide (12 parts by mass) as a white pigment and Twin4000 (0.5 parts by mass) as a surfactant were added to a curable liquid composition for an under layer. PR122 (3 parts by mass) as a magenta pigment and Wet500 (0.5 parts by mass) as a surfactant were added to a curable liquid composition for an upper layer. They were stirred to obtain curable liquid compositions for the under layer and the upper layer of Example 1 in Table 1. Note that, a relationship between the "under layer" and the "upper layer" in Examples of Tables 1 to 4 corresponds to a relationship between a suitable "first curable liquid composition" and a suitable "second curable liquid composition". Meanwhile, a relationship between the "under layer" and the "upper layer" in Comparative Examples of Tables 1 to 4 includes not only a relationship between an unsuitable "first curable liquid composition" and an unsuitable "second curable liquid composition", but also a relationship between a suitable or unsuitable "third curable liquid composition" and a suitable or an unsuitable "first curable liquid composition".

Examples 2 to 6 and Comparative Examples 1 to 8

—Preparation of Curable Liquid Composition—

Curable liquid compositions of Examples 2 to 6 and Comparative Examples 1 to 8 were prepared in the same manner as in Example 1 except that the formulation and the amounts in Example 1 were changed to those presented in Tables 1 to 4.

Each of the curable liquid compositions obtained was measured for the static surface tension and the dynamic surface tension in the following manners. Results were presented in Table 1 to Table 4.

<Static Surface Tension>

Measurement was performed using a platinum plate by the plate method at 25° C. with an automatic surface tensiometer (DY-300, obtained from Kyowa Interface Science Co., Ltd).

<Dynamic Surface Tension>

A dynamic surface tension meter (DynoTesterm, obtained from SITA) was used to measure a dynamic surface tension for 150 msec at 25° C.

—Evaluation of Dot Diameter and Entrance Rate in Combination of Two Kinds of Curable Liquid Compositions—

Next, the prepared curable liquid compositions were used in combination described in the following Tables 1 to 4 to produce a laminated body. Note that, a pigment was appropriately added in order to evaluate the image quality and the state of multilayer formation. However, this is not always a suitable combination of colors in an actual printed matter. A relationship between the "under layer" and the "upper layer" corresponds to a relationship between the "first curable liquid composition" and the "second curable liquid composition", or a relationship between the "third curable liquid composition" and the "first curable liquid composition". A relationship between the "under layer" and the "upper layer" in Examples corresponds to a suitable "first curable liquid composition" and a suitable "second curable liquid composition".

In an inkjet discharging apparatus in which a plurality of inkjet heads and a UV light source as presented in FIG. 2 were mounted in a series of carriage, MH5421 (obtained from Ricoh Company, Ltd.) as an inkjet head and a light source of UV-LED having a wavelength of 395 nm as a device for emitting active energy rays were equipped. The curable liquid compositions in combination described in Table 1 to Table 4 were loaded into the apparatus.

Using the aforementioned inkjet discharging apparatus, on a polycarbonate substrate (obtained from MITSUBISHI GAS CHEMICAL COMPANY, INC., IUPILON NF-2000, thickness: 0.5 mm), a curable liquid composition set including two kinds of curable liquid compositions was discharged and irradiated with UV rays through the same scanning (one scanning), regarding those described as "intermediately after". Regarding those described as "over time", a curable liquid composition set including two kinds of curable liquid compositions was irradiated with UV rays 34 seconds after the curable liquid composition set was discharged.

The curable liquid composition of the under layer was printed so as to form a square having a side length of 2 cm. The curable liquid composition of the upper layer was printed at its central part so as to form a square having a side length of 1 cm. Note that, the output of the light source of UV-LED having a wavelength of 395 nm was set to illuminance of 4.5 W/cm$^2$. The moving velocity of the carriage was set to 840 mm/sec. The difference between the head and the UV irradiation device was set to 20 cm. The amount of one droplet was set to 18 ng. The curable liquid composition of the under layer was set to have a dot density of 600 dpi×600 dpi and a thickness of 10 μm. The dot density of the curable liquid composition of the upper layer was set to 150 dpi×150 dpi when the dot diameter was measured. The dot density of the curable liquid composition of the upper layer was set to 600 dpi×600 dpi when the image quality was evaluated.

<Measurement of Dot Diameter and Entrance Rate>

A laser microscope (OLS4100, obtained from Olympus Corporation) was used to obtain a color image and a laser microscope image. Different dot diameters may be obtained in the color image and the laser image. The "entire dot diameter" (internal dot area) was determined from the dot diameter of the color image. The "surface dot diameter" (surface exposure dot area) was measured from the dot diameter of the laser image. Moreover, [1–("surface dot diameter"/"entire dot diameter")]×100 was defined as "entrance rate" (%).

Figure 5:
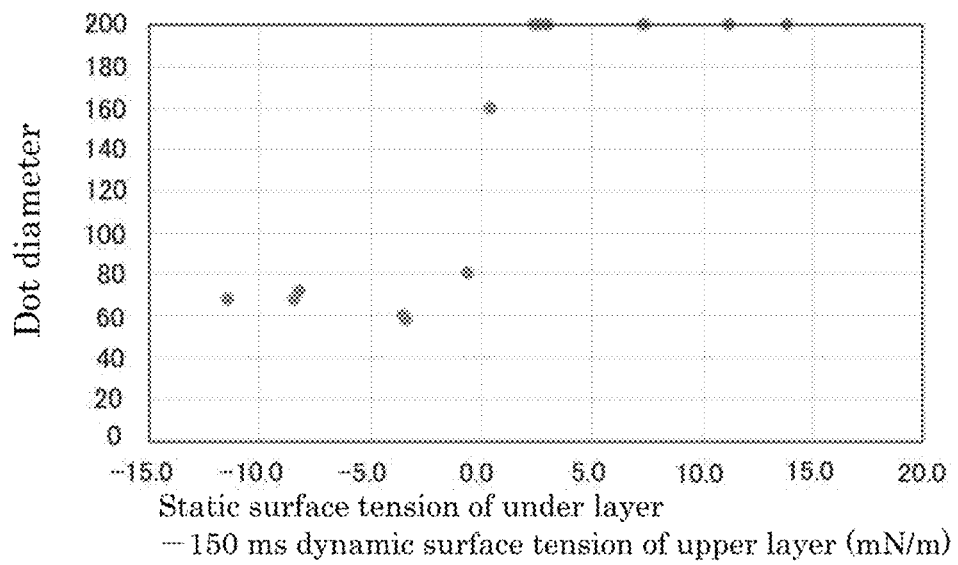
FIG. 5 is a graph presenting a relationship between a difference between surface tensions, and a dot diameter in Examples and Comparative Examples.
Figure 6A:
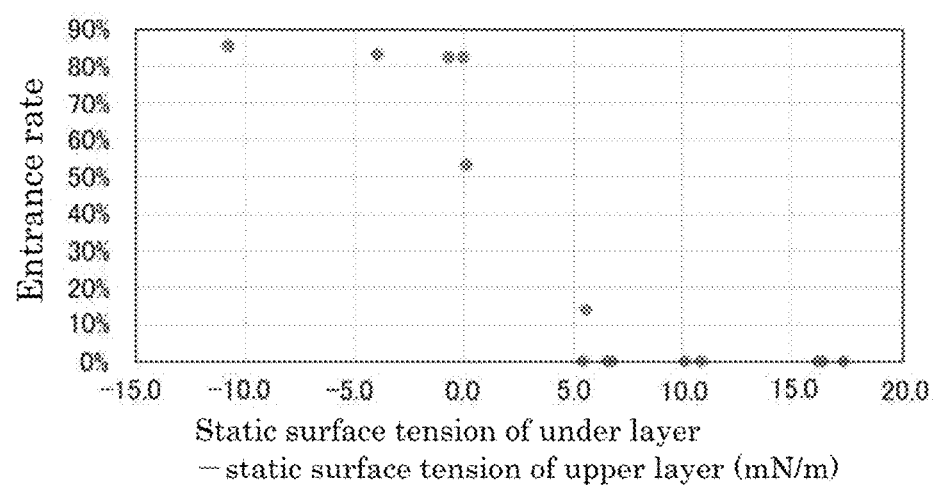
FIG. 6A is a graph presenting a relationship between a difference between surface tensions, and an entrance rate (immediately after) in Examples and Comparative Examples.
Figure 6B:
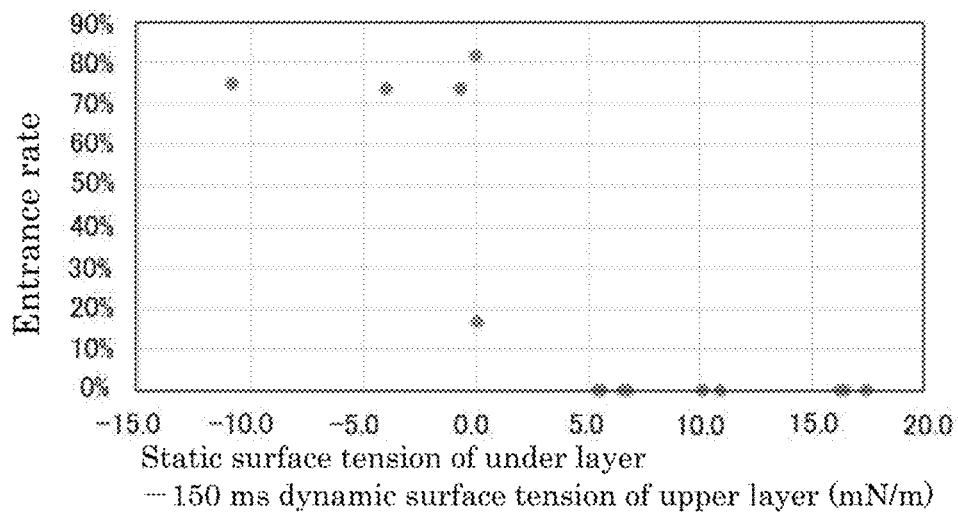
FIG. 6B is a graph presenting a relationship between a difference between surface tensions, and an entrance rate (over time) in Examples and Comparative Examples.

FIG. 5 presents a graph of a relationship between the difference between surface tensions and the dot diameter of each curable liquid composition. FIG. 6A and FIG. 6B present a graph of a relationship between the difference between surface tensions and the entrance rate of each curable liquid composition.

Figure 7A:
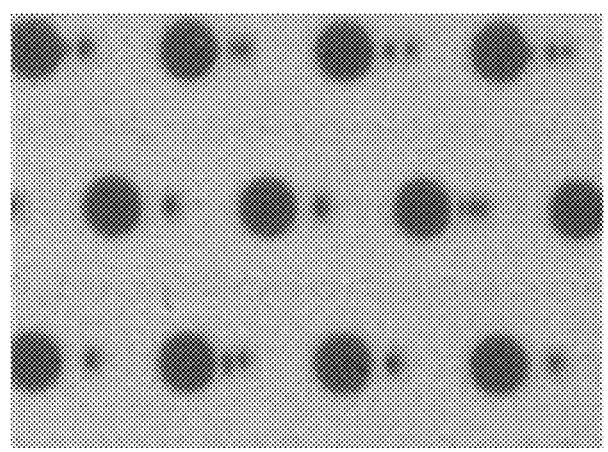
FIG. 7A is a color image where an entire dot diameter in Examples and Comparative Examples is 60 μm.
Figure 7B:
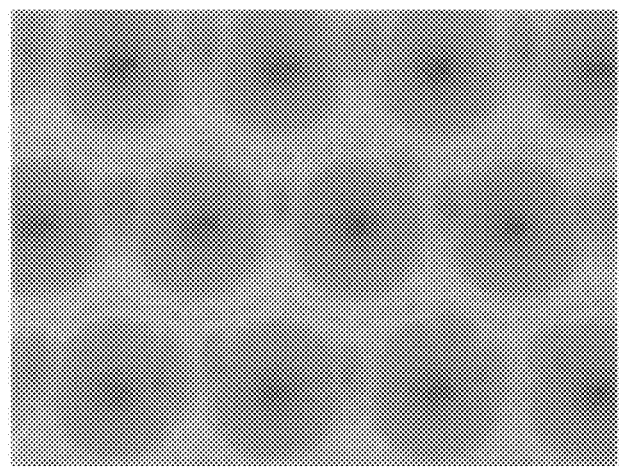
FIG. 7B is a color image where an entire dot diameter in Examples and Comparative Examples is 160 μm.
Figure 7C:
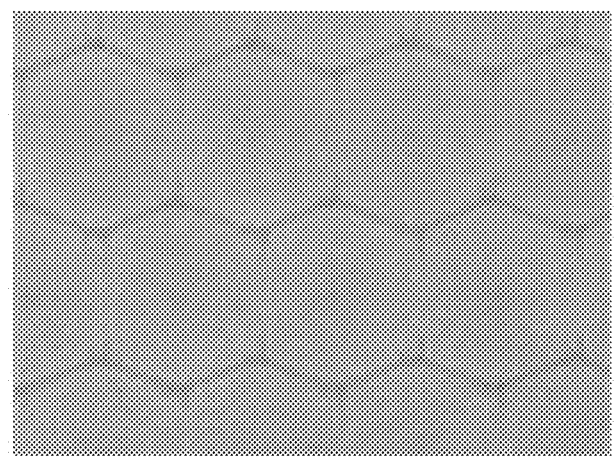
FIG. 7C is a color image where an entire dot diameter in Examples and Comparative Examples is 200 μm or more.

FIG. 7A to FIG. 7C each present a color image different in the "entire dot diameter". FIG. 7A presents a color image having an "entire dot diameter" of 60 μm. FIG. 7B presents a color image having an "entire dot diameter" of 160 μm. FIG. 7C presents a color image having an "entire dot diameter" of 200 μm or more. Evaluation was performed at a dot density of 150 dpi×150 dpi. A dot diameter of 200 μm or more was not measured, and its result was described as "200 or more" in Table 1 to Table 4. In that case, a hexagonal lattice shape was obtained as presented in FIG. 7C.

Figure 8A:
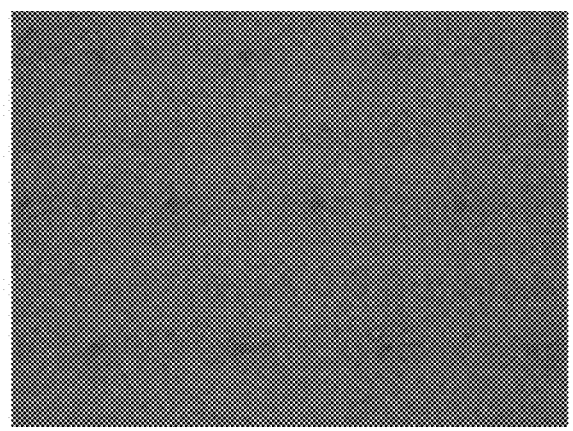
FIG. 8A is a laser image where an entrance rate in Examples and Comparative Examples is 85%.
Figure 8B:
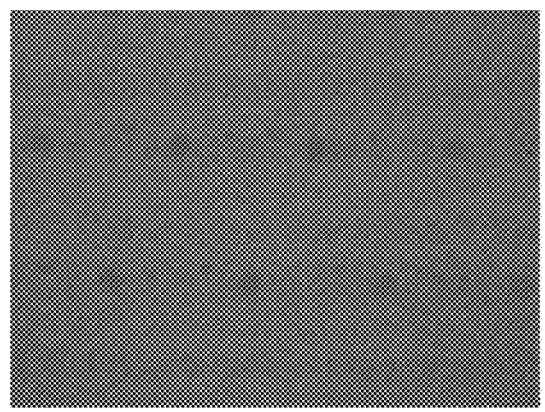
FIG. 8B is a laser image where an entrance rate in Examples and Comparative Examples is 53%.
Figure 8C:
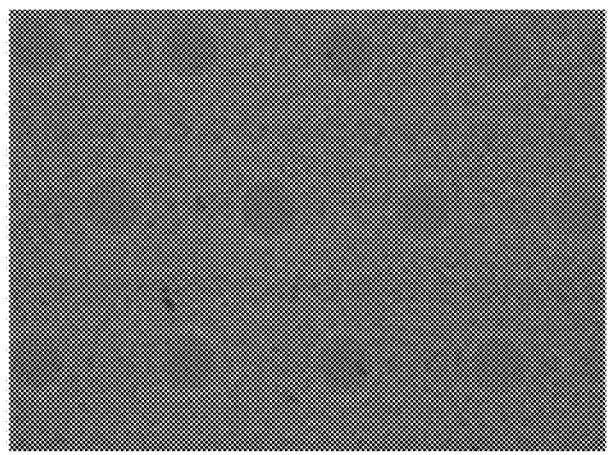
FIG. 8C is a laser image where an entrance rate in Examples and Comparative Examples is 0%.

FIG. 8A to FIG. 8C each present a laser image different in the "entrance rate". FIG. 8A is a laser image having an "entrance rate" of 85%. FIG. 8B is a laser image having an "entrance rate" of 53%. FIG. 8C is a laser image having an "entrance rate" of 0%.

As presented in Table 1 to Table 4 and FIG. 7A to FIG. 7C, the "entire dot diameter" was 50 μm or more at minimum. However, a smaller dot diameter was obtained in the laser image, which was defined as the "surface dot diameter".

<Evaluation of Image Quality>

The curable liquid composition of the under layer was printed so as to form a square having a side length of 2 cm. The curable liquid composition of the upper layer was printed at its central part on the square of the under layer so as to form a square having a side length of 1 cm. A change in image size of the printed portion of the upper layer part was evaluated for precision of an image shape based on the following criteria. The mage size of the printed portion was defined as the maximum length of a portion including not only a dark color portion of the colored portion (magenta in this Example) of the upper layer, but also a light portion where the color ran and spread.

[Evaluation Criteria]

A: An image size was less than 1.1 cm at maximum both immediately after (printing and UV irradiation through the same scanning) and after time passed (UV irradiation performed 34 seconds after the printing) (over time).

B: An image size was less than 1.1 cm at maximum immediately after (printing and UV irradiation through the same scanning), but an image size after time passed (UV irradiation performed 34 seconds after the printing) was increased to 1.1 cm or more at maximum.

C: Even immediately after (printing and UV irradiation through the same scanning), an image size was increased to 1.1 cm or more at maximum.

TABLE 1

| | | Ex. 1 | | Ex. 2 | | Ex. 3 | | Ex. 4 | |
|---|---|---|---|---|---|---|---|---|---|
| | | Under layer | Upper layer | Under layer | Upper layer | Under layer | Upper layer | Under layer | Upper layer |
| Monomer | ACMO | 18 | 18 | 18 | 18 | 18 | 18 | 18 | 18 |
| | PEA | 40 | 40 | 40 | 40 | 40 | 40 | 40 | 40 |
| | CTFA | 30 | 30 | 30 | 30 | 30 | 30 | 30 | 30 |
| | CN963 | 2 | 2 | 2 | 2 | 2 | 2 | 2 | 2 |
| Polymerization initiator | TPO | 10 | 10 | 10 | 10 | 10 | 10 | 10 | 10 |
| Colorant | TiO$_2$ | 12 | — | 12 | — | 12 | — | 12 | — |
| | PR122 | — | 3 | — | 3 | — | 3 | — | 3 |
| Surfactant | Wet 500 | — | 0.5 | — | — | — | — | — | — |
| | Twin 4000 | 0.5 | — | 0.5 | — | 0.5 | — | 0.5 | — |
| | Twin 4100 | — | — | — | 0.5 | — | — | — | — |
| | Flow 425 | — | — | — | — | — | 0.5 | — | — |
| | Rad 2100 | — | — | — | — | — | — | — | 0.5 |
| | Rad 2200 N | — | — | — | — | — | — | — | — |
| | Glide 432 | — | — | — | — | — | — | — | — |
| | Rad 2500 N | — | — | — | — | — | — | — | — |
| Static surface tension (mN/m) of under layer: A | | 27.2 | — | 27.2 | — | 27.2 | — | 27.2 | — |
| 150 msec dynamic surface tension (mN/m) of upper layer: B | | — | 38.6 | — | 35.4 | — | 35.6 | — | 30.7 |
| Static surface tension (mN/m) of upper layer: C | | — | 38.0 | — | 31.2 | — | 27.9 | — | 27.1 |
| Difference between surface tensions (A − B) (mN/m) | | −11.4 | | −8.2 | | −8.4 | | −3.5 | |
| Difference between surface tensions (A − C) (mN/m) | | −10.8 | | −4.0 | | −0.7 | | 0.1 | |
| Immediately after | Entire dot diameter (μm) | 68 | | 72 | | 68 | | 60 | |
| | Surface dot diameter (μm) | 10 | | 12 | | 12 | | 28 | |
| | Entrance rate (%) | 85 | | 83 | | 82 | | 53 | |
| After time passed | Entire dot diameter (μm) | 80 | | 76 | | 76 | | 72 | |
| | Surface dot diameter (μm) | 20 | | 20 | | 20 | | 60 | |
| | Entrance rate (%) | 75 | | 74 | | 74 | | 17 | |
| Evaluation result | Image quality | A | | A | | A | | B | |

TABLE 2

| | | Ex. 5 | | Comp. Ex. 1 | | Comp. Ex. 2 | |
|---|---|---|---|---|---|---|---|
| | | Under layer | Upper layer | Under layer | Upper layer | Under layer | Upper layer |
| Monomer | ACMO | 18 | 18 | 18 | 18 | 18 | 18 |
| | PEA | 40 | 40 | 40 | 40 | 40 | 40 |
| | CTFA | 30 | 30 | 30 | 30 | 30 | 30 |
| | CN963 | 2 | 2 | 2 | 2 | 2 | 2 |
| Polymerization initiator | TPO | 10 | 10 | 10 | 10 | 10 | 10 |
| Colorant | TiO$_2$ | 12 | — | 12 | — | 12 | — |
| | PR122 | — | 3 | — | 3 | — | 3 |
| Surfactant | Wet 500 | — | — | — | — | — | — |
| | Twin 4000 | 0.5 | — | 0.5 | — | 0.5 | — |
| | Twin 4100 | — | — | — | — | — | — |
| | Flow 425 | — | — | — | — | — | — |
| | Rad 2100 | — | — | — | — | — | — |

TABLE 2-continued

|  |  | Ex. 5 | | Comp. Ex. 1 | | Comp. Ex. 2 | |
| --- | --- | --- | --- | --- | --- | --- | --- |
|  |  | Under layer | Upper layer | Under layer | Upper layer | Under layer | Upper layer |
|  | Rad 2200 N | — | 0.5 | — | — | — | — |
|  | Glide 432 | — | — | — | 0.5 | — | — |
|  | Rad 2500 N | — | — | — | — | — | 0.5 |
| Static surface tension (mN/m) of under layer: A | | 27.2 | — | 27.2 | — | 27.2 | — |
| 150 msec dynamic surface tension (mN/m) of upper layer: B | | — | 30.6 | — | 26.8 | — | 24.2 |
| Static surface tension (mN/m) of upper layer: C | | — | 21.6 | — | 20.6 | — | 21.8 |
| Difference between surface tensions (A − B) (mN/m) | | −3.4 | | 0.4 | | 3.0 | |
| Difference between surface tensions (A − C) (mN/m) | | 5.6 | | 6.6 | | 5.5 | |
| Immediately after | Entire dot diameter (μm) | 58 | | 160 | | 200 or more | |
|  | Surface dot diameter (μm) | 50 | | 160 | | 200 or more | |
|  | Entrance rate (%) | 14 | | 0 | | 0 | |
| After time passed | Entire dot diameter (μm) | 128 | | 200 or more | | 200 or more | |
|  | Surface dot diameter (μm) | 128 | | 200 or more | | 200 or more | |
|  | Entrance rate (%) | 0 | | 0 | | 0 | |
| Evaluation result | Image quality | B | | C | | C | |

TABLE 3

|  |  | Ex. 6 | | Comp. Ex. 3 | | Comp. Ex. 4 | | Comp. Ex. 5 | |
| --- | --- | --- | --- | --- | --- | --- | --- | --- | --- |
|  |  | Under layer | Upper layer | Under layer | Upper layer | Under layer | Upper layer | Under layer | Upper layer |
| Monomer | ACMO | 18 | 18 | 18 | 18 | 18 | 18 | 18 | 18 |
|  | PEA | 40 | 40 | 40 | 40 | 40 | 40 | 40 | 40 |
|  | CTFA | 30 | 30 | 30 | 30 | 30 | 30 | 30 | 30 |
|  | CN963 | 2 | 2 | 2 | 2 | 2 | 2 | 2 | 2 |
| Polymerization initiator | TPO | 10 | 10 | 10 | 10 | 10 | 10 | 10 | 10 |
| Colorant | TiO$_2$ | 12 | — | 12 | — | 12 | — | 12 | — |
|  | PR122 | — | 3 | — | 3 | — | 3 | — | 3 |
| Surfactant | Wet 500 | 0.5 | 0.5 | 0.5 | — | 0.5 | — | 0.5 | — |
|  | Twin 4000 | — | — | — | — | — | — | — | — |
|  | Twin 4100 | — | — | — | 0.5 | — | — | — | — |
|  | Flow 425 | — | — | — | — | — | 0.5 | — | — |
|  | Rad 2100 | — | — | — | — | — | — | — | 0.5 |
|  | Rad 2200 N | — | — | — | — | — | — | — | — |
|  | Glide 432 | — | — | — | — | — | — | — | — |
|  | Rad 2500 N | — | — | — | — | — | — | — | — |
| Static surface tension (mN/m) of under layer: A | | 38.0 | — | 38.0 | — | 38.0 | — | 38.0 | — |
| 150 msec dynamic surface tension (mN/m) of upper layer: B | | — | 38.6 | — | 35.4 | — | 35.6 | — | 30.7 |
| Static surface tension (mN/m) of upper layer: C | | — | 38.0 | — | 31.2 | — | 27.9 | — | 27.1 |
| Difference between surface tensions (A − B) (mN/m) | | −0.6 | | 2.6 | | 2.4 | | 7.3 | |
| Difference between surface tensions (A − C) (mN/m) | | 0.0 | | 6.8 | | 10.2 | | 10.9 | |
| Intermediate after | Entire dot diameter (μm) | 80 | | 200 or more | | 200 or more | | 200 or more | |
|  | Surface dot diameter (μm) | 14 | | 200 or more | | 200 or more | | 200 or more | |
|  | Entrance rate (%) | 83 | | 0 | | 0 | | 0 | |
| After time passed | Entire dot diameter (μm) | 108 | | 200 or more | | 200 or more | | 200 or more | |
|  | Surface dot diameter (μm) | 20 | | 200 or more | | 200 or more | | 200 or more | |
|  | Entrance rate (%) | 81 | | 0 | | 0 | | 0 | |
| Evaluation result | Image quality | B | | C | | C | | C | |

TABLE 4

|  |  | Comp. Ex. 6 | | Comp. Ex. 7 | | Comp. Ex. 8 | |
| --- | --- | --- | --- | --- | --- | --- | --- |
|  |  | Under layer | Upper layer | Under layer | Upper layer | Under layer | Upper layer |
| Monomer | ACMO | 18 | 18 | 18 | 18 | 18 | 18 |
|  | PEA | 40 | 40 | 40 | 40 | 40 | 40 |
|  | CTFA | 30 | 30 | 30 | 30 | 30 | 30 |
|  | CN963 | 2 | 2 | 2 | 2 | 2 | 2 |
| Polymerization initiator | TPO | 10 | 10 | 10 | 10 | 10 | 10 |

TABLE 4-continued

|  |  | Comp. Ex. 6 | | Comp. Ex. 7 | | Comp. Ex. 8 | |
| --- | --- | --- | --- | --- | --- | --- | --- |
|  |  | Under layer | Upper layer | Under layer | Upper layer | Under layer | Upper layer |
| Colorant | TiO$_2$ | 12 | — | 12 | — | 12 | — |
|  | PR122 | — | 3 | — | 3 | — | 3 |
| Surfactant | Wet 500 | 0.5 | — | 0.5 | — | 0.5 | — |
|  | Twin 4000 | — | — | — | — | — | — |
|  | Twin 4100 | — | — | — | — | — | — |
|  | Flow 425 | — | — | — | — | — | — |
|  | Rad 2100 | — | — | — | — | — | — |
|  | Rad 2200 N | — | 0.5 | — | — | — | — |
|  | Glide 432 | — | — | — | 0.5 | — | — |
|  | Rad 2500 N | — | — | — | — | — | 0.5 |
| Static surface tension (mN/m) of under layer: A | | 38.0 | — | 38.0 | — | 38.0 | — |
| 150 msec dynamic surface tension (mN/m) of upper layer: B | | — | 30.6 | — | 26.8 | — | 24.2 |
| Static surface tension (mN/m) of upper layer: C | | — | 21.6 | — | 20.6 | — | 21.8 |
| Difference between surface tensions (A − B) (mN/m) | | 7.4 | | 11.2 | | 13.8 | |
| Difference between surface tensions (A − C) (mN/m) | | 16.4 | | 17.4 | | 16.3 | |
| Intermediate after | Entire dot diameter (μm) | 200 or more | | 200 or more | | 200 or more | |
|  | Surface dot diameter (μm) | 200 or more | | 200 or more | | 200 or more | |
|  | Entrance rate (%) | 0 | | 0 | | 0 | |
| After time passed | Entire dot diameter (μm) | 200 or more | | 200 or more | | 200 or more | |
|  | Surface dot diameter (μm) | 200 or more | | 200 or more | | 200 or more | |
|  | Entrance rate (%) | 0 | | 0 | | 0 | |
| Evaluation result | Image quality | C | | C | | C | |

From the results of Table 1 to Table 4, it was found that, in Examples 1 to 3 and Example 6, the curable liquid composition of the upper layer greatly entered (penetrated) into the curable liquid composition of the under layer with the dot shape maintained; its state was maintained even after time passed; and the precision of an image shape and the sharpness were considerably high.

In Example 4, it was found that the curable liquid composition of the upper layer relatively slightly penetrated into the curable liquid composition of the under layer after immediately; entrance (penetration) was reduced after time passed but penetration proceeded after time passed; and the precision of an image shape and the sharpness were high.

In Example 5, it was found that the curable liquid composition of the upper layer did not penetrate into the under layer after time passed but the curable liquid composition of the upper layer penetrated into the under layer after immediately; and at least the precision of an image shape and the sharpness after immediately were high.

In Comparative Example 1, it was found that the curable liquid composition of the upper layer did not penetrate into the under layer; the dots spread on the surface; and the precision of an image shape and the sharpness were low after immediately.

In Comparative Examples 2 and 3, it was found that the curable liquid composition of the upper layer did not penetrate into the under layer; the curable liquid composition spread largely so as to instantly cover the surface at a dot density of 150 dpi×150 dpi; and the precision of an image shape and the sharpness after immediately were low.

In Comparative Examples 4 to 8, it was found that the curable liquid composition of the upper layer did not penetrate into the under layer; the curable liquid composition spread largely so as to instantly cover the surface at a dot density of 150 dpi×150 dpi; the precision of an image shape and the sharpness after immediately were low; and an image was distorted after time passed and blur occurred significantly.

Examples 7 and 8, and Comparative Examples 9 to 11

—Preparation of Laminated Body Including Three Kinds of Curable Liquid Compositions—

Materials were mixed and stirred in amounts described in Table 5 to prepare the first curable liquid composition, the second curable liquid composition, the third curable liquid composition A, and the third curable liquid composition B, respectively. The numerical values of the components in Table 5 were represented by "parts by mass".

Each of the curable liquid compositions obtained was measured for viscosity at 25° C. in the following manner.
<Viscosity at 25° C.>

Using a cone plate-type rotational viscometer VISCOMETER TVE-22L (obtained from Toki Sangyo Co., Ltd) with a cone rotor (1° 34'×R24), viscosity at 25° C. was measured by setting the number of revolutions to 50 rpm and by setting a temperature of constant-temperature circulating water to 25° C.

Next, a curable liquid composition set presented in Table 6 was used to produce a laminated body in the following manner. Note that, a pigment was appropriately added in order to evaluate the image quality and the state of multi-layer formation. However, this is not always a suitable combination of colors in an actual printed matter. The formulation of monomers is a combination for the purpose of evaluating functional separation by multilayer formation. The laminated body of the present disclosure can be produced even when it has another formulation of monomers other than the aforementioned formulation of monomers. The formulation of monomers was changed, but an influence of a changed formulation of monomers was small. Therefore, it was confirmed that the same impact behavior as those in the experimental examples in Tables 1 to 4 occurred even in experimental examples in Table 6.

In an inkjet discharging apparatus in which a plurality of inkjet heads and a UV light source as presented in FIG. 2 were mounted in a series of carriage, MH5421 (obtained from Ricoh Company, Ltd.) as an inkjet head and a light source of UV-LED having a wavelength of 395 nm as a device for emitting active energy rays were equipped. A curable liquid composition set presented in Table 6 was loaded.

Using the aforementioned inkjet discharging apparatus, on a polycarbonate substrate (obtained from MITSUBISHI GAS CHEMICAL COMPANY, INC., IUPILON NF-2000, thickness: 0.5 mm), a curable liquid composition set including three kinds of curable liquid compositions was discharged and irradiated with UV rays through the same scanning (one scanning), to produce a laminated body. Note that, the output of the light source of UV-LED having a wavelength of 395 nm was set to illuminance of 3 W/cm$^2$. The moving velocity of the carriage was set to 840 mm/sec. The amount of one droplet was set to 18 ng. The dot density was set to 600 dpi×600 dpi. The thickness of each layer was set to 10 μm.

Each of the obtained laminated bodies was evaluated for the pencil hardness, the ethanol resistance, and the adhesiveness in the following manners. Results are presented in Table 6.

<Pencil Hardness>

Each of the obtained laminated bodies was subjected to scratch hardness (pencil method) test according to the JIS K5600 5-4 at a load of 750 g using a pencil scratch hardness tester (obtained from COTEC) (model: KT-VF239 D.

<Ethanol Resistance>

Using a rubbing fastness tester for dyed matters (model: AR-2, obtained from INTEC CO., LTD), the ethanol resistance was evaluated by referring to the JIS A6921 in the following manner. First, cotton 3-1 (Khanaqin No. 3) of the JIS L0803 as a white cloth was wetted with ethanol. Then, each of the obtained laminated bodies was rubbed with the cotton at a load of 200 g 50 times. Before and after the rubbing color fading test, a color difference ΔE*ab measured by X-Rite eXact (obtained from X-Rite) was measured and was evaluated for the ethanol resistance based on the following evaluation criteria.

[Evaluation Criteria]

A: The ΔE*ab was less than 1.77, and appearance of the laminated body was not changed.

B: The ΔE*ab was 1.77 or more but less than 7.12, and appearance of the laminated body was not changed.

C: The ΔE*ab was 7.12 or more, or appearance of the laminated body was changed (e.g., scratch and exposure of the substrate).

<Adhesiveness>

On the each of the laminated bodies, eleven scratches were made vertically and horizontally at 1 mm intervals using a cutter guide to form 100 squares. A piece of cellulose tape (registered trademark) No. 405 (obtained from Nichiban Co., Ltd.) was strongly allowed to adhere to the squares. Then, the tape was exfoliated at one time. A rate of exfoliated squares was determined and was evaluated for the adhesiveness based on the following evaluation criteria.

[Evaluation Criteria]

A: The rate of exfoliated squares was less than 5%.

B: The rate of exfoliated squares was 5% or more but less than 35%.

C: The rate of exfoliated squares was 35% or more.

TABLE 5

|  |  | Third curable liquid composition A | Third curable liquid composition B | First curable liquid composition | Second curable liquid composition |
|---|---|---|---|---|---|
| Monomer | ACMO | 18 | 18 | — | — |
|  | PEA | 40 | 40 | — | — |
|  | CTFA | 30 | 15 | — | — |
|  | DEGDA | — | 15 | 88 | 88 |
|  | DPHA | — | — | 12 | 12 |
|  | CN963 | 2 | 2 | — | — |
| Polymerization initiator | TPO | 10 | 10 | 9 | 9 |
| Colorant | TiO$_2$ | 12 | 12 | — | — |
|  | PR122 | — | — | — | 3 |
| Surfactant | Wet 500 | 0.5 | 0.5 | — | 0.5 |
|  | Twin 4000 | — | — | 0.5 | — |
| Total (parts by mass) |  | 112.5 | 112.5 | 109.5 | 112.5 |
| Amount of monofunctional monomer in third curable composition (% by mass) |  | 98 | 81 | 0 | 0 |
| Viscosity at 25° C. (mPa · s) |  | 23 | 20 | 20 | 23 |

TABLE 6

|  |  | Ex. 7 | Ex. 8 | Comp. Ex. 9 | Comp. Ex. 10 | Comp. Ex. 11 |
|---|---|---|---|---|---|---|
| Curable liquid composition set | Third liquid layer | Third curable liquid composition A | Third curable liquid composition B | Third curable liquid composition | Second curable liquid composition | First curable liquid composition |
|  | First liquid layer | First curable liquid composition | First curable liquid composition | Third curable liquid composition | Second curable liquid composition | First curable liquid composition |

TABLE 6-continued

|  |  | Ex. 7 | Ex. 8 | Comp. Ex. 9 | Comp. Ex. 10 | Comp. Ex. 11 |
|---|---|---|---|---|---|---|
|  | Second droplet layer | Second curable liquid composition | Second curable liquid composition | Third curable liquid composition | Second curable liquid composition | First curable liquid composition |
| Evaluation results | Pencil hardness | H | H | HB | H | H |
|  | Ethanol resistance | A | A | C | B | A |
|  | Adhesiveness | A | B | A | C | C |

From the results in Table 6, it was found that Examples 7 and 8 could achieve high pencil hardness and high adhesiveness because the third liquid layer formed of the third curable liquid composition for adhering to the substrate was covered by the first curable liquid composition for covering. Similarly to Examples 1 to 6, it was found that because the second curable liquid composition for drawing was embedded in the first liquid layer, no color was lost with ethanol and high ethanol resistance was achieved.

It was found that because only the third curable liquid composition was used as the curable liquid composition set, Comparative Example 9 achieved adhesiveness but had low pencil hardness and low ethanol resistance.

It was found that Comparative Example 10 achieved high pencil hardness but had considerably low adhesiveness because only the second curable liquid composition was used as the curable liquid composition set. Regarding the ethanol resistance, it was found that appearance of the coating film was not changed, but the color transferred to a white cloth was slightly found because the second liquid droplet layer for drawing was exposed.

It was found that Comparative Example 11 achieved high pencil hardness because only the first curable liquid composition was used as the curable liquid composition set. It was found that appearance of the coating film was not changed, the ethanol resistance was good, and no transferred color was observed because of a clear ink, but the adhesiveness was considerably low.

Detailed contents of the materials used in Examples and Comparative Examples in Table 1 to Table 5 are as follows.
<Monomer>
<<Monofunctional Monomer>>
  ACMO: acryloylmorpholine, obtained from KJ Chemicals Corporation, ACMO
  CTFA: cyclic trimethylolpropane formal acrylate, obtained from OSAKA ORGANIC CHEMICAL INDUSTRY LTD., VISCOAT #200
  PEA: phenoxyethyl acrylate, obtained from OSAKA ORGANIC CHEMICAL INDUSTRY LTD., VISCOAT #192
<<Multifunctional Monomer>>
  DEGDA: cliethylene glycol diacrylate, obtained from Hitachi Chemical Company, Ltd., FA-222A
  DPHA: clipentaerythritol hexaacrylate, obtained from Nippon Kayaku Co., Ltd., KAYARAD DPHA
  CN963: aliphatic urethane acrylate, obtained from SARTOMER, CN963J85
<Surfactant>
<<Silicone-Based Surfactant>>
  Twin 4000: obtained from Evonik, TEGO Twin 4000
  Twin 4100: obtained from Evonik, TEGO Twin 4100
  Flow 425: obtained from Evonik, TEGO Flow 425
  Rad 2100: obtained from Evonik, TEGO Rad 2100
  Rad 2200N: obtained from Evonik, TEGO Rad 2200 N
  Glide 432: obtained from Evonik, TEGO Glide 432
  Rad 2500N: obtained from Evonik, TEGO Rad 2500 N
<<Organic Surfactant>>
  Wet500: obtained from Evonik, TEGO Wet 500
<Polymerization Initiator>
  PO: 2,4,6-trimethylbenzoyl-diphenyl-phosphine oxide, obtained from iGM, Omnirad TPO H
<Colorant>
  $TiO_2$: titanium oxide (colorant for white ink)
  Magenta pigment: PR122 (colorant for magenta ink)

Aspects of the present disclosure are as follows, for example.

<1> A method for producing a laminated body using a first curable liquid composition and a second curable liquid composition, the method including:
  forming a first liquid layer formed of the first curable liquid composition;
  impacting the second curable liquid composition onto the first liquid layer, to form a second liquid droplet layer formed of the second curable liquid composition inside the first liquid layer or at a lower part of the first liquid layer in a direction in which second liquid droplets for the second liquid droplet layer are impacted onto the first liquid layer; and curing the first liquid layer and the second liquid droplet layer.

<2> The method for producing a laminated body according to <1>,
  wherein the first curable liquid composition and the second curable liquid composition are liquid compositions different in formulation.

<3> The method for producing a laminated body according to <1> or <2>,
  wherein both the forming the first liquid layer and the impacting the second curable liquid composition are performed by an inkjet method.

<4> The method for producing a laminated body according to <1> further using a third curable liquid composition, the method further including:
  impacting the third curable liquid composition onto a substrate to form a third liquid layer formed of the third curable liquid composition;
  impacting the first curable liquid composition onto the third liquid layer to form a first liquid layer on the third liquid layer;
  impacting the second curable liquid composition onto the first liquid layer, to form a second liquid droplet layer formed of the second curable liquid composition inside the first liquid layer or inside the third liquid layer that is positioned at a lower part of the first liquid layer in a direction in which second liquid droplets for the second liquid droplet layer are impacted onto the first liquid layer; and curing the first liquid layer, the second liquid droplet layer, and the third liquid layer.

<5> The method for producing a laminated body according to <4>,
wherein the first curable liquid composition and the second curable liquid composition are liquid compositions different in formulation;
the first curable liquid composition and the third curable liquid composition are liquid compositions different in formulation; or
the first curable liquid composition and the second curable liquid composition are liquid compositions different in formulation and the first curable liquid composition and the third curable liquid composition are liquid compositions different in formulation.

<6> The method for producing a laminated body according to <4> or <5>,
wherein the forming the first liquid layer, the impacting the second curable liquid composition, and the impacting the third curable liquid composition are performed by an inkjet method.

<7> A laminated body including:
a first liquid layer formed of a first curable liquid composition; and
a second liquid droplet layer formed of a second curable liquid composition,
wherein the second liquid droplet layer exists inside the first liquid layer or at a lower part of the first liquid layer in a direction in which second liquid droplets for the second liquid droplet layer are impacted onto the first liquid layer, and the second liquid droplet layer has a dot shape, and
the second liquid droplet layer satisfies an expression below:

"internal dot area">"surface exposure dot area".

<8> The laminated body according to <7>, further including
a third liquid layer formed of a third curable liquid composition,
wherein the second liquid droplet layer exists inside the first liquid layer or inside the third liquid layer that is positioned at a lower part of the first liquid layer in a direction in which second liquid droplets for the second liquid droplet layer are impacted onto the first liquid layer, and the second liquid droplet layer has a dot shape, and
the second liquid droplet layer satisfies an expression below:

"internal dot area">"surface exposure dot area".

<9> The laminated body according to <7> or <8>,
wherein the second liquid droplet layer satisfies an expression below:

"surface exposure dot area"/"internal dot area"<0.5.

<10> A curable liquid composition set including:
a first curable liquid composition; and
a second curable liquid composition,
wherein the curable liquid composition set satisfies an expression below:

"static surface tension of the first curable liquid composition"−"150 msec dynamic surface tension of the second curable liquid composition"≤0 mN/m, and the curable liquid composition set satisfies an expression below:

"static surface tension of the first curable liquid composition"−"static surface tension of the second curable liquid composition"<6 mN/m.

<11> The curable liquid composition set according to <10>, further including
a third curable liquid composition,
wherein the curable liquid composition set satisfies an expression below:

"static surface tension of the third curable liquid composition"−"static surface tension of the first curable liquid composition">0 mN/m.

<12> The curable liquid composition set according to <10> or <11>,
wherein the curable liquid composition set further satisfies an expression below: "static surface tension of the first curable liquid composition"−"static surface tension of the second curable liquid composition"<3 mN/m.

<13> The curable liquid composition set according to <12>,
wherein the curable liquid composition set satisfies an expression below:

"static surface tension of the first curable liquid composition"−"static surface tension of the second curable liquid composition"≤0 mN/m.

<14> The curable liquid composition set according to any one of <11> to <13>,
wherein the curable liquid composition set satisfies an expression below:

"static surface tension of the third curable liquid composition"−"150 msec dynamic surface tension of the first curable liquid composition">−1 mN/m.

<15> The curable liquid composition set according to any one of <11> to <14>,
wherein the first curable liquid composition is a clear ink, the second curable liquid composition is a color ink or a white ink, and
the third curable liquid composition is a clear ink or a white ink.

<16> The curable liquid composition set according to any one of <10> to <15>,
wherein the first curable liquid composition includes a silicone-based surfactant.

<17> The curable liquid composition set according to any one of <11> to <16>,
wherein the first curable liquid composition and the second curable liquid composition include a multifunctional monomer in an amount of 50% by mass or more relative to a total amount of monomers, and
the third curable liquid composition includes a monofunctional monomer in an amount of 80% by mass or more relative to the total amount of monomers.

<18> The curable liquid composition set according to any one of <11> to <17>,
wherein the first curable liquid composition, the second curable liquid composition, and the third curable liquid composition have a viscosity of less than 40 mPa·s at 25° C.

<19> The curable liquid composition set according to <18>,
wherein the curable liquid composition set satisfies an expression below:

"viscosity of the third curable liquid composition at 25° C."−"viscosity of the first curable liquid composition at 25° C.">−15mPa·s;

the curable liquid composition set satisfies an expression below:

15mPa·s>"viscosity of the third curable liquid composition at 25° C."−"viscosity of the second curable liquid composition at 25° C.">−15 mPa·s; and the curable liquid composition set satisfies an expression below:

15 mPa·s>"viscosity of the first curable liquid composition at 25° C."–"viscosity of the second curable liquid composition at 25° C.".

<20> The method for producing a laminated body according to any one of <1> to <6>,
wherein the first curable liquid composition, the second curable liquid composition, and the third curable liquid composition are the first curable liquid composition, the second curable liquid composition, and the third curable liquid composition in the curable liquid composition set according to any one of <10> to <19>.

<21> An inkjet printing apparatus including:
a first discharging unit configured to discharge a first curable liquid composition to form a first liquid layer;
a second discharging unit configured to discharge a second curable liquid composition to form a second liquid droplet layer;
a curing unit configured to cure the first liquid layer and the second liquid droplet layer; and
a composition storing part that stores each curable liquid composition in the curable liquid composition set according to any one of <10> to <19>.

<22> An inkjet printing method using the curable liquid composition set according to any one of <10> to <19>, the method including:
discharging a first curable liquid composition to form a first liquid layer;
discharging a second curable liquid composition to form a second liquid droplet layer; and
curing the first liquid layer and the second liquid droplet layer.

The method for producing a laminated body according to any one of <1> to <6> and <20>, the laminated body according to any one of <7> to <9>, the curable liquid composition set according to any one of <10> to <19>, the inkjet printing apparatus according to <21>, and the inkjet printing method according to <22> can solve the conventionally existing problems in the art and can achieve the object of the present disclosure.

What is claimed is:

1. A method for producing a laminated body using a first curable liquid composition and a second curable liquid composition, the method comprising:
forming a first liquid layer formed of the first curable liquid composition;
impacting the second curable liquid composition onto the first liquid layer, to form a second liquid droplet layer formed of the second curable liquid composition inside the first liquid layer or at a lower part of the first liquid layer in a direction in which second liquid droplets for the second liquid droplet layer are impacted onto the first liquid layer; and
curing the first liquid layer and the second liquid droplet layer, wherein the expression below is satisfied:
"static surface tension of the first curable liquid composition"— "150 msec dynamic surface tension of the second curable liquid composition"<0 mN/m.

2. The method for producing a laminated body according to claim 1, wherein the first curable liquid composition and the second curable liquid composition are liquid compositions different in formulation.

3. The method for producing a laminated body according to claim 1,
wherein both the forming the first liquid layer and the impacting the second curable liquid composition are performed by an inkjet method.

4. The method for producing a laminated body according to claim 1 further using a third curable liquid composition, the method further comprising:
impacting the third curable liquid composition onto a substrate to form a third liquid layer formed of the third curable liquid composition;
impacting the first curable liquid composition onto the third liquid layer to form a first liquid layer on the third liquid layer;
impacting the second curable liquid composition onto the first liquid layer, to form a second liquid droplet layer formed of the second curable liquid composition inside the first liquid layer or inside the third liquid layer that is positioned at a lower part of the first liquid layer in a direction in which second liquid droplets for the second liquid droplet layer are impacted onto the first liquid layer; and
curing the first liquid layer, the second liquid droplet layer, and the third liquid layer.

5. The method for producing a laminated body according to claim 4,
wherein the first curable liquid composition and the second curable liquid composition are liquid compositions different in formulation;
the first curable liquid composition and the third curable liquid composition are liquid compositions different in formulation; or
the first curable liquid composition and the second curable liquid composition are liquid compositions different in formulation and the first curable liquid composition and the third curable liquid composition are liquid compositions different in formulation.

6. A laminated body comprising:
a first liquid layer formed of a first curable liquid composition; and
a second liquid droplet layer formed of a second curable liquid composition,
wherein the second liquid droplet layer exists inside the first liquid layer or at a lower part of the first liquid layer in a direction in which second liquid droplets for the second liquid droplet layer are impacted onto the first liquid layer, and the second liquid droplet layer has a dot shape, and
the second liquid droplet layer satisfies an expression below: "internal dot area" >"surface exposure dot area",
wherein the expression below is satisfied: "static surface tension of the first curable liquid composition"— "150 msec dynamic surface tension of the second curable liquid composition"<0 mN/m.

7. The laminated body according to claim 6, further comprising:
a third liquid layer formed of a third curable liquid composition,
wherein the second liquid droplet layer exists inside the first liquid layer or inside the third liquid layer that is positioned at a lower part of the first liquid layer in a direction in which second liquid droplets for the second liquid droplet layer are impacted onto the first liquid layer, and the second liquid droplet layer has a dot shape, and
the second liquid droplet layer satisfies an expression below:
"internal dot area" >"surface exposure dot area".

8. The laminated body according to claim 6,
wherein the second liquid droplet layer satisfies an expression below:
"surface exposure dot area"/ "internal dot area"<0.5.

9. A curable liquid composition set comprising:
a first curable liquid composition; and
a second curable liquid composition,
wherein the curable liquid composition set satisfies an expression below: "static surface tension of the first curable liquid composition"— "150 msec dynamic surface tension of the second curable liquid composition"<0 mN/m, and
the curable liquid composition set satisfies an expression below: "static surface tension of the first curable liquid composition"— "static surface tension of the second curable liquid composition"<6 mN/m.

10. The curable liquid composition set according to claim 9, further comprising
a third curable liquid composition,
wherein the curable liquid composition set satisfies an expression below: "static surface tension of the third curable liquid composition"— "static surface tension of the first curable liquid composition" >0 mN/m.

11. The curable liquid composition set according to claim 9,
wherein the curable liquid composition set further satisfies an expression below:
"static surface tension of the first curable liquid composition"— "static surface tension of the second curable liquid composition"<3 mN/m.

12. The curable liquid composition set according to claim 11,
wherein the curable liquid composition set satisfies an expression below: "static surface tension of the first curable liquid composition"— "static surface tension of the second curable liquid composition"<0 mN/m.

13. The curable liquid composition set according to claim 10,
wherein the curable liquid composition set satisfies an expression below: "static surface tension of the third curable liquid composition"— "150 msec dynamic surface tension of the first curable liquid composition" >—1 mN/m.

14. The curable liquid composition set according to claim 10,
wherein the first curable liquid composition is a clear ink,
the second curable liquid composition is a color ink or a white ink, and
the third curable liquid composition is a clear ink or a white ink.

15. The curable liquid composition set according to claim 9,
wherein the first curable liquid composition includes a silicone-based surfactant.

16. The curable liquid composition set according to claim 10,
wherein the first curable liquid composition and the second curable liquid composition include a multifunctional monomer in an amount of 50% by mass or more relative to a total amount of monomers, and
the third curable liquid composition includes a monofunctional monomer in an amount of 80% by mass or more relative to the total amount of monomers.

17. The curable liquid composition set according to claim 10,
wherein the first curable liquid composition, the second curable liquid composition, and the third curable liquid composition have a viscosity of less than 40 mPas at 25° C.

18. The curable liquid composition set according to claim 17,
wherein the curable liquid composition set satisfies an expression below: "viscosity of the third curable liquid composition at 25° C."— "viscosity of the first curable liquid composition at 25° C." >—15 mPa s;
the curable liquid composition set satisfies an expression below: 15 mPa s >"viscosity of the third curable liquid composition at 25° C."— "viscosity of the second curable liquid composition at 25° C." >—15 mPa s; and
the curable liquid composition set satisfies an expression below: 15 mPa s >"viscosity of the first curable liquid composition at 25° C."— "viscosity of the second curable liquid composition at 25° C.".

19. An inkjet printing apparatus comprising:
a first discharging unit configured to discharge a first curable liquid composition to form a first liquid layer;
a second discharging unit configured to discharge a second curable liquid composition to form a second liquid droplet layer;
a curing unit configured to cure the first liquid layer and the second liquid droplet layer; and
a composition storing part that stores each curable liquid composition in the curable liquid composition set according to claim 9.

20. An inkjet printing method using the curable liquid composition set according to claim 9, the method comprising:
discharging a first curable liquid composition to form a first liquid layer;
discharging a second curable liquid composition to form a second liquid droplet layer; and
curing the first liquid layer and the second liquid droplet layer.

* * * * *